United States Patent
Goyal et al.

(10) Patent No.: US 11,463,883 B2
(45) Date of Patent: Oct. 4, 2022

(54) CELLULAR SERVICE ACCOUNT TRANSFER FOR ACCESSORY WIRELESS DEVICES

(71) Applicant: Apple Inc., Cupertino, CA (US)

(72) Inventors: Anish Kumar Goyal, Milpitas, CA (US); Chenzhi Yu, Sunnyvale, CA (US); Francisco J. Gonzalez, San Diego, CA (US); Li Li, Los Altos, CA (US); Raj S. Chaugule, Santa Clara, CA (US); Rohan C. Malthankar, San Jose, CA (US); Samy Touati, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 215 days.

(21) Appl. No.: 17/001,575

(22) Filed: Aug. 24, 2020

(65) Prior Publication Data
US 2021/0076204 A1    Mar. 11, 2021

Related U.S. Application Data

(60) Provisional application No. 62/897,917, filed on Sep. 9, 2019.

(51) Int. Cl.
*H04W 12/04*      (2021.01)
*H04W 4/00*       (2018.01)
(Continued)

(52) U.S. Cl.
CPC .......... *H04W 12/72* (2021.01); *H04B 1/3818* (2015.01); *H04L 67/53* (2022.05);
(Continued)

(58) Field of Classification Search
CPC ..... H04W 12/72; H04W 76/10; H04W 12/50; H04W 8/205; H04W 12/06; H04B 1/3818; H04L 67/53
(Continued)

(56) References Cited

U.S. PATENT DOCUMENTS 8,924,715 B2 * 12/2014 Schell ................. H04W 12/086
                                                                455/411
9,009,475 B2 *  4/2015 Hauck ....................... H04L 9/32
                                                                713/168
(Continued)

FOREIGN PATENT DOCUMENTS

CN         1496660 A      5/2004
CN       103813302 A      5/2014
(Continued)

OTHER PUBLICATIONS

Chinese Patent Application No. 202010897856.9—Notification to Grant dated Mar. 16, 2022.
(Continued)

*Primary Examiner* — Haresh N Patel
(74) *Attorney, Agent, or Firm* — Dickinson Wright RLLP

(57) ABSTRACT

This Application describes efficient cellular service transfer mechanisms to move cellular services that are based on cellular service credentials, e.g., eSIMs, between accessory wireless devices under various scenarios, including in some embodiments transfer of multiple eSIMs. The first and second accessory wireless devices and the primary wireless device are associated with a common user account. Transfer of credentials for cellular service access can occur between two accessory wireless devices via the primary wireless device, where the primary wireless device and the accessory wireless devices interact with applicable network-based servers.

20 Claims, 14 Drawing Sheets

(51) Int. Cl.
*H04W 12/72* (2021.01)
*H04W 76/10* (2018.01)
*H04W 8/20* (2009.01)
*H04W 12/06* (2021.01)
*H04B 1/3818* (2015.01)
*H04W 12/50* (2021.01)
*H04L 67/53* (2022.01)
*H04L 29/06* (2006.01)
*H04L 67/1097* (2022.01)
*H04L 67/02* (2022.01)

(52) U.S. Cl.
CPC ........... *H04W 8/205* (2013.01); *H04W 12/06* (2013.01); *H04W 12/50* (2021.01); *H04W 76/10* (2018.02); *H04L 67/02* (2013.01); *H04L 67/1097* (2013.01)

(58) Field of Classification Search
USPC ............................................................ 726/6
See application file for complete search history.

(56) References Cited

U.S. PATENT DOCUMENTS

| | | | | |
|---|---|---|---|---|
| 10,721,688 | B2 * | 7/2020 | Gui | H04M 1/72412 |
| 11,129,014 | B2 * | 9/2021 | Li | H04W 8/26 |
| 11,206,701 | B2 * | 12/2021 | Walia | H04W 60/00 |
| 11,297,492 | B2 * | 4/2022 | Yang | H04W 12/72 |
| 2005/0207562 | A1 | 9/2005 | Nachef et al. | |
| 2015/0237496 | A1 | 8/2015 | Gao et al. | |
| 2016/0088465 | A1 * | 3/2016 | Golla | H04W 72/0493 455/450 |
| 2016/0241537 | A1 * | 8/2016 | Cha | H04L 63/20 |
| 2018/0098178 | A1 | 4/2018 | Yerrabommanahalli et al. | |
| 2018/0206123 | A1 | 7/2018 | Guday et al. | |
| 2019/0075453 | A1 | 3/2019 | Yoon et al. | |
| 2019/0253884 | A1 | 8/2019 | Fan et al. | |
| 2020/0059778 | A1 | 2/2020 | Li et al. | |
| 2020/0092711 | A1 * | 3/2020 | Chen | H04W 8/205 |
| 2020/0260241 | A1 * | 8/2020 | Sicard | H04W 8/245 |
| 2021/0258794 | A1 * | 8/2021 | Jin | H04W 8/205 |
| 2021/0400494 | A1 * | 12/2021 | Li | H04W 8/183 |
| 2022/0104005 | A1 * | 3/2022 | Xiong | H04W 12/30 |

FOREIGN PATENT DOCUMENTS

| | | |
|---|---|---|
| CN | 107071733 A | 8/2017 |
| CN | 107734498 A | 2/2018 |
| CN | 107925871 A | 4/2018 |
| CN | 108353270 A | 7/2018 |
| CN | 108353278 A | 7/2018 |
| CN | 108810123 A | 11/2018 |
| CN | 109906623 A | 6/2019 |

OTHER PUBLICATIONS

Chinese Patent Application No. 202010897856.9—First Office Action dated Nov. 3, 2021.

* cited by examiner

CELLULAR SERVICE ACCOUNT TRANSFER FOR ACCESSORY WIRELESS DEVICES

CROSS-REFERENCE TO RELATED APPLICATIONS

The present application claims the benefit of U.S. Provisional Application No. 62/897,917, entitled "CELLULAR SERVICE ACCOUNT TRANSFER FOR ACCESSORY WIRELESS DEVICES," filed Sep. 9, 2019, the content of which is incorporated by reference herein in its entirety for all purposes.

FIELD

The described embodiments relate to wireless communications, including methods and apparatus to support transfer of cellular wireless services, such as cellular voice and data services authorized by electronic SIM (eSIMs), between accessory wireless devices linked to a primary wireless device.

BACKGROUND

Newer generation, e.g., fourth generation (4G) and fifth generation (5G), cellular wireless networks, which use newer radio access technology and implement one or more $3^{rd}$ Generation Partnership Project (3GPP) Long Term Evolution (LTE), LTE Advanced (LTE-A), and 5G standards, are rapidly being developed and deployed by network operators worldwide. The newer cellular wireless networks provide a range of packet-based voice and data services. A user of a wireless device can access services offered by a wireless network service provider, also referred to as a mobile network operator (MNO), based on service subscriptions controlled by authentication credentials included in a profile, also referred to as a subscriber identity module (SIM), when included in a removable universal integrated circuit card (UICC), also referred to as a SIM card, or as an electronic SIM (eSIM), when included in an embedded UICC (eUICC) of the wireless device. With a removable UICC and unlocked wireless devices that accommodate removable UICCs, a user can transfer the UICC/SIM combination between the unlocked wireless devices. Accessory wireless device, however, are linked with primary wireless devices and can include only eSIMs on an eUICC of the accessory wireless device. Transfer of a cellular service associated with an eSIM of an eUICC of an accessory wireless device to an eUICC of another accessory wireless device can require interaction with associated MNO servers. There exists a need for mechanisms to allow a user to transfer cellular services associated with one or eSIMs efficiently between accessory wireless devices.

SUMMARY

This Application describes efficient cellular service transfer mechanisms to move cellular services that are based on cellular service credentials, e.g., eSIMs, between accessory wireless devices that are associated with a primary wireless device under various scenarios, including, in some embodiments, transfer of multiple eSIMs. To simplify initial configuration or subsequent restoration of an accessory wireless device, a user can seek to transfer cellular services for one or more eSIMs from a first accessory wireless device to a second accessory wireless device, where the first and second accessory wireless devices are each associated with a common primary wireless device. In some embodiments, the first and second accessory wireless devices and the primary wireless device are associated with a common user account. Transfer of credentials for cellular service access can occur between two accessory wireless devices via the primary wireless device, e.g., where the accessory wireless devices can connect securely to the primary wireless device via a local connection, such as via a wireless personal area network (WPAN) connection, via a wireless local area network (WLAN) connection, via a peer-to-peer connection, or the like. In some embodiments, the first accessory wireless device can provide information to the primary wireless device and/or to an online network-based service, such as an iCloud® service, and the information can be used to transfer cellular service credentials to the second accessory wireless device. In some embodiments, the first accessory wireless device may not be available when configuring or restoring the second wireless accessory device, and previously stored information can be used to transfer cellular service access credentials to the second wireless accessory device. An accessory wireless device can include multiple eSIMs, of which one may be in an enabled state and others in a disabled state. In some embodiments, a user can determine cellular service credentials from one or more eSIMs to transfer from the first accessory wireless device to the second accessory wireless device. Information regarding the transferability of the cellular services for eSIMs of a first accessory wireless device can be obtained from cellular service information and/or associated MNO information stored in the first accessory wireless device, stored in an associated network-based service, and/or stored in an associated primary wireless device. Transferability information can also be obtained from associated MNO servers. Transferability information for eSIMs of the first accessory wireless device to the second accessory wireless device can be presented, including an option to transfer cellular service credentials for one or more eSIMs, can be presented via an associated primary wireless device, such as during configuration or restoration of the second wireless accessory device. In some embodiments, first accessory wireless device and the primary wireless device share a common cellular service account managed by an associated MNO. In some embodiments, the first accessory wireless device and the primary wireless device may not share a common cellular service account of an associated MNO. In some embodiments, the first accessory wireless device or the primary wireless device may each use distinct cellular service accounts managed by different MNOs. Transfer of cellular service credentials to the second accessory wireless device can be accomplished via mechanisms detailed herein in each of these scenarios.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, where like reference numerals designate like structural elements.

DETAILED DESCRIPTION

Figure 1:
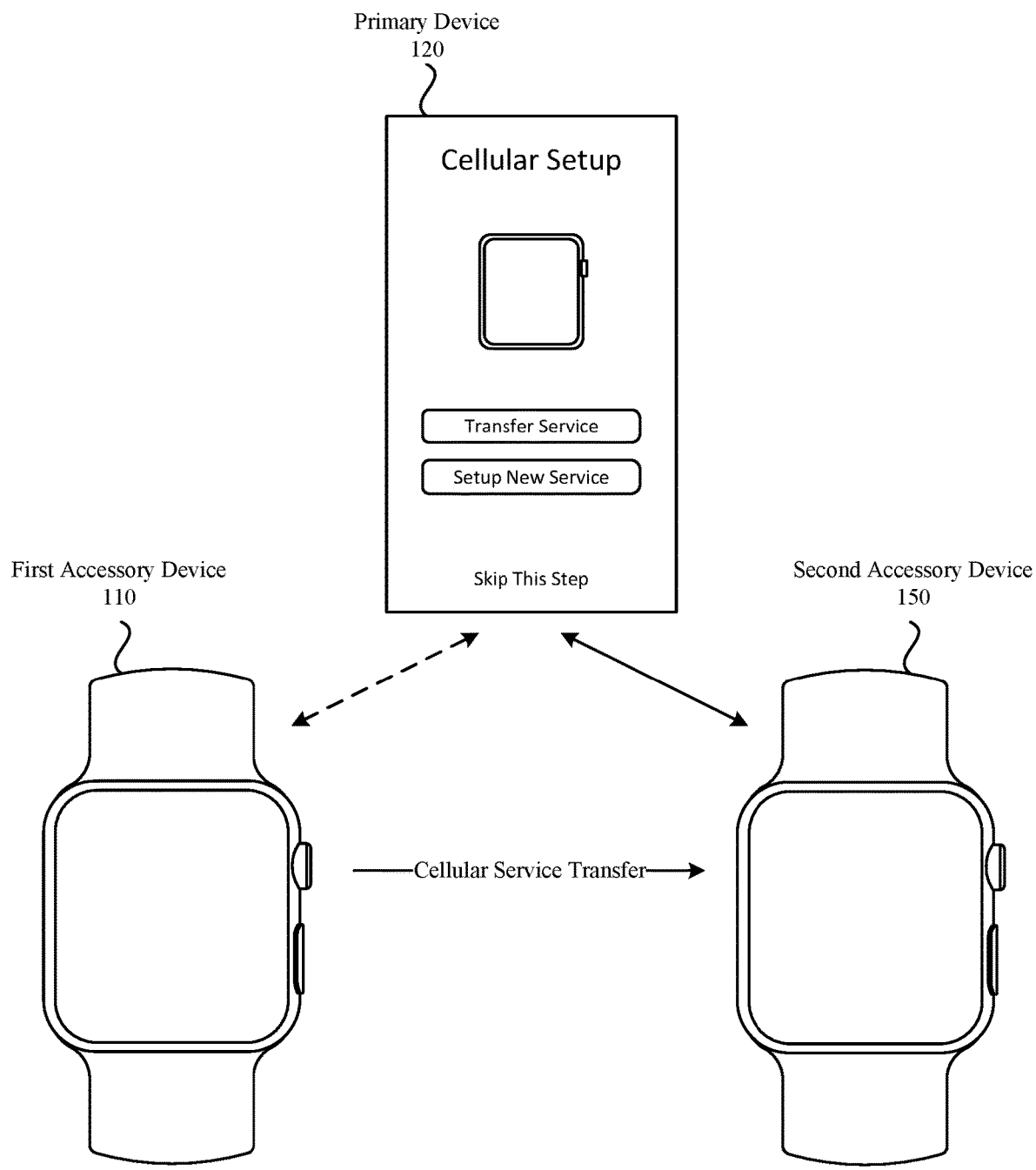
FIG. 1 illustrates a diagram of an exemplary transfer of cellular service account credentials for access to cellular services from a first accessory device to a second accessory device linked to a primary device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This Application describes efficient cellular service transfer mechanisms that can be used to move cellular services that are based on cellular service credentials, e.g., eSIMs, between accessory wireless devices efficiently under various scenarios, including transfer of multiple eSIMs. Accessory wireless devices can refer to wireless devices that are linked to a primary wireless device as an anchor point, and both the accessory wireless devices and the primary wireless device are capable of connecting with a cellular wireless network via a wireless cellular access network based on credentials stored therein. Exemplary accessory wireless devices include cellular capable wearable devices and Internet of Things (IoT) devices, where the accessory wireless devices include an eUICC to store eSIMs and exclude removable UICC cards (SIM cards). In some embodiments, an accessory wireless device can operate independently of an associated primary wireless device and may or may not share a common mobile network operator (MNO) or a common cellular services account. To simplify initial configuration or subsequent restoration of an accessory wireless device, a user can seek to transfer cellular services for one or more eSIMs from a first accessory wireless device, e.g., an "old" accessory wireless device that was already linked previously with the primary wireless device, to a second accessory wireless device, e.g., a "new" accessory wireless device to be paired with the primary wireless device. In some embodiments, the first accessory wireless device, the second accessory wireless device, and the primary wireless device are each associated with a common user account that is separate from a cellular service account, e.g., an account authenticated by an Apple ID. Transfer of credentials for cellular service access between two accessory wireless devices can occur via the primary wireless device, e.g., where the accessory wireless devices can connect securely to the primary wireless device via a local connection, such as via a wireless personal area network (WPAN) connection, via a wireless local area network (WLAN) connection, via a peer-to-peer connection, or the like. In some embodiments, the first accessory wireless device can provide information to the primary wireless device and/or to an online network-based service, such as an iCloud® service, and the information can be used in a procedure to transfer cellular service credentials to the second accessory wireless device. In some embodiments, the first accessory wireless device may not be available when configuring or restoring the second wireless accessory device. In some embodiments, previously stored information obtained from the first accessory wireless device, e.g., by the primary wireless device, can be used to transfer cellular service access credentials to the second wireless accessory device.

An accessory wireless device, in some embodiments, can include multiple eSIMs, of which one SIM may be in an enabled state, while the remaining eSIMs may be in a disabled state. In some embodiments, a user can select which of one or more eSIMs to transfer from the first accessory wireless device to the second accessory wireless device. Information regarding the transferability of the cellular services for eSIMs of a first accessory wireless device can be obtained from cellular service information and/or associated MNO information stored in the first accessory wireless device, stored in an associated third-party network-based service, stored in an associated primary wireless device, or stored in associated MNO servers. Transferability information for eSIMs of the first accessory wireless device to the second accessory wireless device can be presented to a user, e.g., via a display or input/output of the primary wireless device. The primary wireless device can present an option to transfer cellular service credentials for one or more eSIMs to the second wireless accessory device during configuration or restoration of the second wireless accessory device. In some embodiments, the first accessory wireless device and the primary wireless device share a common cellular service account managed by an associated MNO. In some embodiments, the first accessory wireless device and the primary wireless device may not share a common cellular service account of an associated MNO, e.g., when each of the first accessory wireless device and the primary wireless device use different cellular service accounts for a same associated MNO. In some embodiments, the first accessory wireless device and the primary wireless device may each use distinct cellular service accounts managed by different MNOs. Transfer of cellular service credentials to the second accessory wireless device can be accomplished via mechanisms detailed herein in each of these scenarios.

In some embodiments, a most recently selected cellular service plan for an eSIM of the first accessory wireless device is used as a default option to transfer to the second accessory wireless device. In some embodiments, a user can select from multiple cellular service plans for different eSIMs of the first accessory wireless device to transfer to the second accessory wireless device. In some embodiments, communication with MNO servers to effect transfer of cellular service credentials to the second accessory wireless device is performed by the primary wireless device. In some embodiments, such as when the first accessory wireless device and the primary wireless device share a common cellular service account or a common MNO, the primary wireless device uses cellular service credentials for a SIM or eSIM of the primary wireless device to authenticate with a network-based server, e.g., an entitlement server, of the associated MNO to transfer the cellular service credentials. In some embodiments, the primary wireless device communicates with one or more MNO servers as a proxy using a token obtained by the first accessory wireless device and accessible to the primary wireless device for authentication with the one or more MNO servers. In some embodiments, the first accessory wireless device communicates with the one or more MNO servers to authenticate and/or authorize transfer of cellular service credentials for one or more eSIMs to the second accessory wireless device. In some embodiments, a user is authenticated using a trust score managed by a third-party server to prove authority to transfer cellular service credentials from the first accessory wireless device to the second wireless accessory device.

These and other embodiments are discussed below with reference to FIGS. 1 through 10; however, those skilled in the art will readily appreciate that the detailed description given herein with respect to these figures is for explanatory purposes only and should not be construed as limiting.

FIG. 1 illustrates a diagram 100 of an exemplary transfer of cellular service credentials from a first accessory device 110 to a second accessory device 150 assisted by a primary device 120. During initial configuration or restoration of the second accessory device 150, the primary device 120 can present an option for configuration of cellular wireless service for the second accessory device 150, e.g., via a display or input/output of the primary device 120. The second accessory device 150 can be paired with the primary device 120 for the initial configuration or restoration, and the primary device can determine that the second accessory device is capable of cellular wireless communication using cellular service credentials for one or more (yet to be installed) eSIMs. In some embodiments, the primary device 120 can present an option for establishing cellular service capability for the second accessory device 150, e.g., to establish a new cellular service for the second accessory device 150 or to transfer cellular service credentials to the second accessory device 150, which can be from the first accessory device 110. In some embodiments, the first accessory device 110 is available and can be in communication with the primary device 120 when configuring the second accessory device 150. In some embodiments, the first accessory device 110 is not available when configuring the second accessory device 150. In some embodiments, the primary device 120 communicates with one or more MNO servers to transfer cellular service credentials from the first accessory device 110 to the second accessory device 150. In some embodiments, the first accessory device 110 also participates by communicating with at least one MNO server to transfer the cellular service credentials to the second accessory device 150. In some embodiments, the second accessory device 150 obtains an eSIM from an associated MNO server via the primary device 120 and installs the eSIM on the second accessory device 150 to enable access to associated cellular wireless services by the second accessory device 150.

Figure 2:
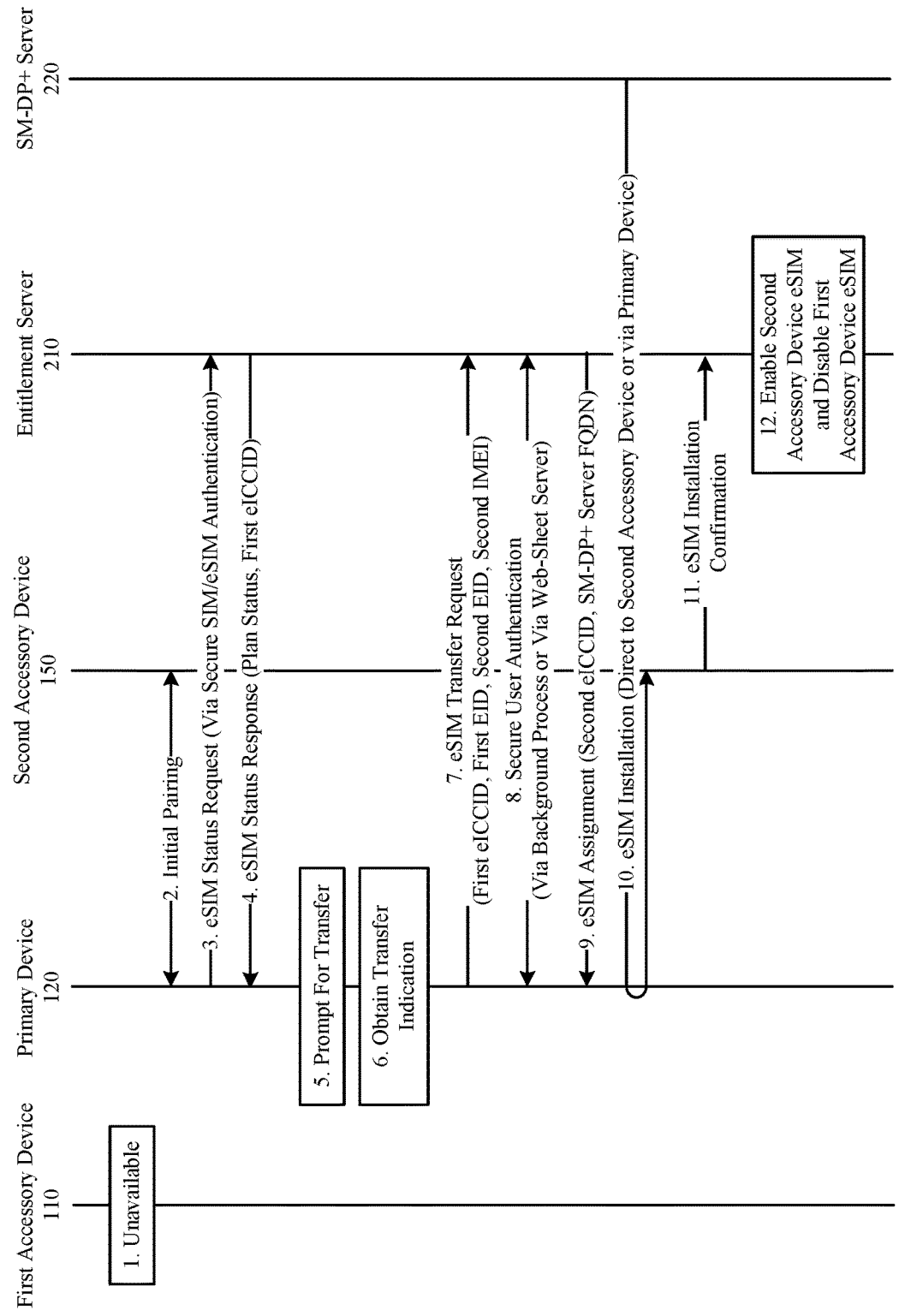
FIG. 2 illustrates an exemplary set of actions for transferring cellular service credentials for an eSIM from a first accessory device to a second accessory device via a primary device that shares an MNO with the first accessory device, according to some embodiments.

FIG. 2 illustrates a diagram 200 of an exemplary set of actions for transferring cellular service credentials for an eSIM from a first accessory device 110 to a second accessory device 150 via a primary device 120 that shares an MNO with the first accessory device 110. The first accessory device 110 was previously (or is currently) associated with the primary device 120 but may be unavailable, as indicated by action 1, to participate in the transfer process. In some embodiments, the primary device 120 and the first accessory device 110 share a common cellular service account managed by the MNO. In some embodiments, the primary device 120 and the first accessory device 110 use separate cellular service accounts that are linked together and billed to a common user. In some embodiments, the primary device 120 and the first accessory device 110 use an identical mobile station international subscriber directory number (MSISDN). In some embodiments, the primary device 120 and the first accessory device 110 use distinct MSISDNs. At action 2, the second accessory device 150 pairs with the primary device 120 to establish a local, secure connection between the second accessory device 150 and the primary device 120. The primary device 120 may be used to configure the second accessory device 150, e.g., as part of an initial configuration or as part of a restore process. At action 3, the primary device 120 requests status for one or more eSIMs of accessory devices, e.g., for the first accessory device 110, that are linked with the primary device 120. The primary device 120 can use cellular service credentials associated with a SIM or eSIM installed in the primary device 120 to authenticate and communicate with an entitlement server 210 of the MNO. At action 4, the entitlement server 210 can send to the primary device 120, responsive to receipt of the request for eSIM status, an eSIM status response that includes cellular service plan status information for one or more eSIMs of associated accessory wireless devices, which includes the first accessory device 110. Status of an eSIM of the first accessory device 110 can be provided in the eSIM status response, and the eSIM of the first accessory device 110 can be identified uniquely based on an electronic international circuit card identifier (eIC- CID) included in the eSIM status response. At action 5, the primary device 120 presents information via a display or input/output of the primary device 120 that prompts a user to select whether to transfer one or more eSIMs to the second accessory device 150. In some embodiments, indicators for eSIMs that are available to transfer to the second accessory device 150 are presented, while any eSIMs that are not available to transfer are not indicated. In some embodiments, an indication of a particular eSIM to transfer is provided, e.g., by indicating a particular MSISDN or other identifier by which a user can determine which cellular service credentials may be transferred to the second accessory device 150. At action 6, the primary device 120 obtains an indication to transfer at least one eSIM of the one or more eSIMs available to transfer to the second accessory device 150. At action 7, the primary device 120 sends to the entitlement server 210 an eSIM transfer request that includes one or more identifiers for the first accessory device 110 and one or more identifiers for the second accessory device 150. In some embodiments, the one or more identifiers for the first accessory device 110 include a first eICCID that specifies a first eSIM of the first accessory device 110 and a first eUICC identifier (EID) that specifies the eUICC of the first accessory device 110. In some embodiments, the one or more identifiers for the second accessory device include a second EID that specifies the eUICC of the second accessory device 110 and a second international mobile equipment identifier (IMEI) that specifies the second accessory device 110. At action 8, the primary device 120 securely authenticates that a user of the first accessory device 110 and/or of the primary device 120 is authorized to transfer cellular service credentials for the specified first eSIM from the first accessory device 110 to the second accessory device 150. In some embodiments, the primary device 120 provides authentication using a background process that includes a previously stored carrier authentication token obtained by the first accessory device 110 and subsequently accessed by the primary device 120. An example of use of such a carrier authentication token is described further herein with respect to FIGS. 5A, 5B, and 9. In some embodiments, the primary device 120 provides authentication by redirecting to a web-sheet server managed by the MNO and by communicating information via a web-sheet user interface with the web-sheet server to demonstrate that a legitimate user of the first accessory device 110 and/or of the primary device 120 authorizes transfer of the cellular service credentials for the first eSIM from the first accessory device 110 to the second accessory device 150. At action 9, upon successful user authentication, the entitlement server 210 sends an eSIM assignment message to the primary device 120. In some embodiments, the eSIM assignment message includes (i) a second eICCID that specifies a second eSIM to be installed in the second accessory device 150, and (ii) a network address for an MNO server, e.g., for a subscription manager data preparation (SM-DP+) server 220. In some embodiments, the network address is a universal resource locator (URL) or a fully qualified domain name (FQDN) that the primary device 120 can use to access the SM-DP+ server 220. At action 10, the second accessory device 150 connects securely to the SM-DP+ server 220 indicated in the eSIM assignment message and downloads securely the second eSIM associated with the second eICCID from the SM-DP+ server 220. The primary device 120 can provide the URL or FQDN of the SM-DP+ server 220 to the second accessory device 150. In some embodiments, the second accessory device 150 connects directly to the SM-DP+ server 220 via a non-cellular access connection. In some embodiments, the second accessory device 150 connects to the SM-DP+ server 220 via a cellular (or non-cellular) access connection established by the primary device 120, where the primary device 120 acts as a data conduit for the second accessory device 150. At action 11, the second accessory device 150 sends a confirmation to the entitlement server 210 of the MNO to indicate successful installation of the second eSIM from the SM-DP+ server 220. At action 12, the entitlement server 210 enables cellular service for the second accessory device 150 based on the second eSIM and disables cellular service for the first accessory device 110 based on the first eSIM.

Figure 3:
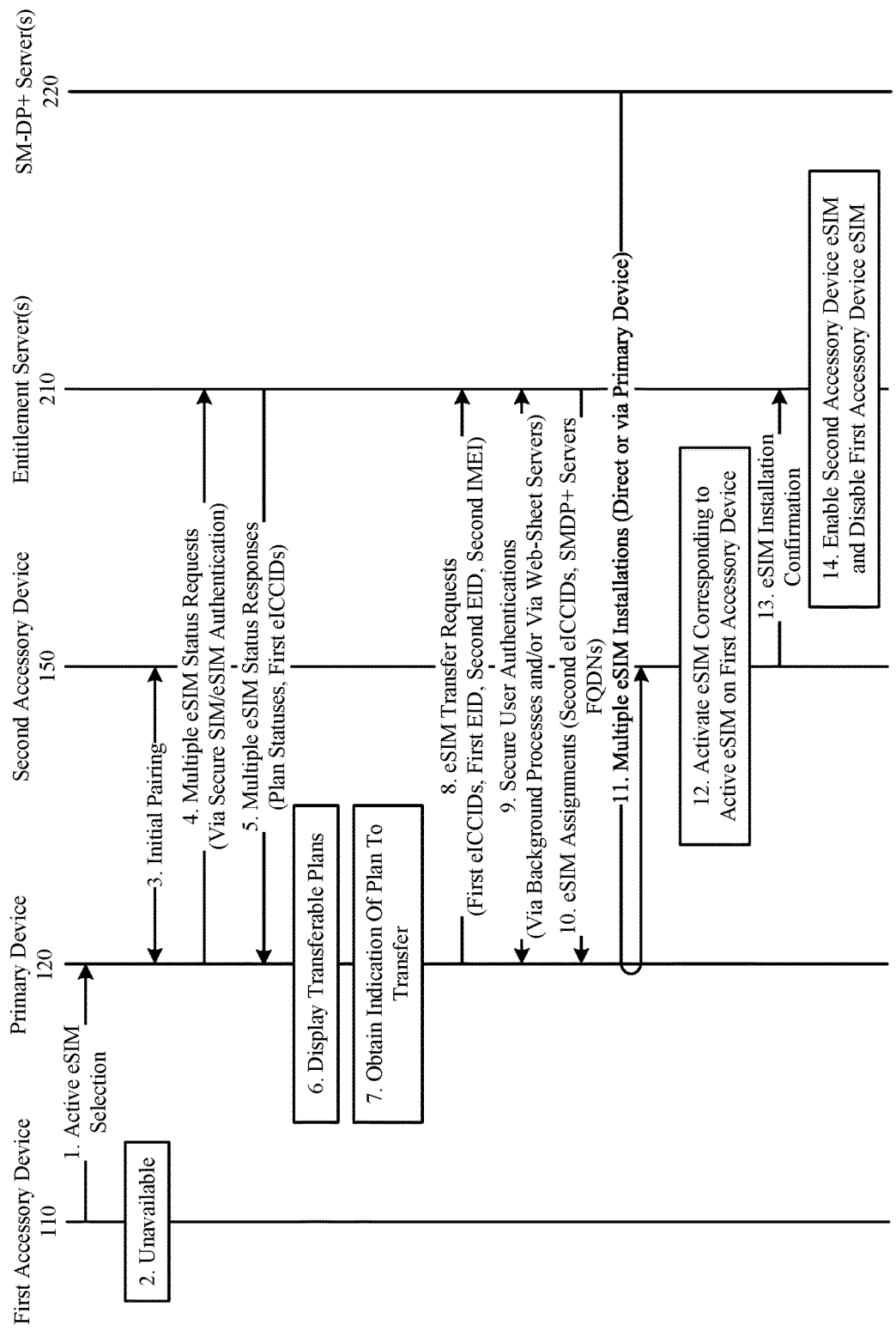
FIGS. 3 and 4 illustrate exemplary sets of actions for transferring cellular service credentials for one or more eSIMs from a first accessory device to a second accessory device via a primary device that shares one or more MNOs with the first accessory device, according to some embodiments.

FIG. 3 illustrates a diagram 300 of an exemplary set of actions for transferring cellular service credentials for a set of one or more eSIMs from a first accessory device 110 to a second accessory device 150 via a primary device 120. The first accessory device 110 can include multiple eSIMs, some of which are provided by different MNOs. The primary device 120 can include a combination of SIM(s)/eSIM(s) that are provided by multiple MNOs, where at least two different MNOs associated with the SIM(s)/eSIM(s) of the primary device 120 are also associated with eSIMs of the first accessory device 110. The first accessory device 110 can include multiple eSIMs for which cellular service credentials could be transferred to the second accessory device 150 via the primary device 120. In some embodiments, the first accessory device 110 includes an active eSIM, selected as indicated at action 1, and one or more inactive eSIMs. The first accessory device 110 can be unavailable, as indicated at action 2, during the process to configure cellular service for the second accessory device 150. At action 3, the second accessory device 150 pairs with the primary device 120 to establish a local, secure connection between the second accessory device 150 and the primary device 120. The primary device 120 may be used to configure the second accessory device 150, e.g., as part of an initial configuration or as part of a restore process. At action 4, the primary device 120 requests status for multiple eSIMs of accessory devices, e.g., for the first accessory device 110, that are linked with the primary device 120. As the primary device 120 includes multiple SIM(s)/eSIM(s) that are associated with different MNOs, the primary device 120, at action 4, submits multiple eSIM status requests, e.g., one eSIM status request to each of the different MNOs that are associated with the SIM(s)/eSIM(s) of the primary device 120. The primary device 120 uses cellular service credentials associated with the SIM(s)/eSIM(s) installed in the primary device 120 to authenticate and communicate with associated entitlement servers 210 of the MNOs to obtain the status of the eSIMs for one or more accessory devices linked with the primary device 110, including the first accessory device 110. At action 5, entitlement servers 210 of the respective MNOs can send to the primary device 120, responsive to receipt of the requests for eSIM status, eSIM status responses that include cellular service plan status information for one or more eSIMs of associated accessory wireless devices, which includes the first accessory device 110. Status for one or more eSIMs of the first accessory device 110 can be provided in the eSIM status responses, and the eSIMs of the first accessory device 110 can be identified uniquely based on first eICCIDs included in the eSIM status response. At action 6, the primary device 120 presents information via a display or input/output of the primary device 120 that includes a list of cellular service plans that may be transferred to the second accessory device 150. In some embodiments, indicators for one or more eSIMs that are available to transfer to the second accessory device 150 are presented, while any eSIMs that are not available to transfer are not indicated. In some embodiments, an indication of one or more particular eSIMs to transfer is provided, e.g., by indicating particular MSISDNs or other identifiers by which a user can determine which cellular service credentials may be transferred to the second accessory device 150. In some embodiments, a most recently selected active eSIM of the first accessory device 110 (e.g., based on action 1) is indicated in the list of cellular service plans presented at action 6. In some embodiment, the most recently selected active eSIM of the first accessory device 110 is presented as a default cellular service plan to transfer to the second accessory device 150. At action 7, the primary device 120 obtains an indication of which cellular service plans to transfer to the second accessory device 150. A user may select a default cellular service plan, a cellular service plan other than the default cellular service plan, a set of two or more cellular service plans, or other combinations of cellular service plans to transfer. In some embodiments, the user indicates which of the multiple cellular service plans should be enabled as the active cellular service plan on the second accessory device 150. At action 8, the primary device 120 sends, to entitlement servers 210 of respective MNOs, eSIM transfer requests that include one or more identifiers for the first accessory device 110 and one or more identifiers for the second accessory device 150. In some embodiments, the one or more identifiers for the first accessory device 110 include first eICCIDs that specify first eSIMs of the first accessory device 110 and a first eUICC identifier (EID) that specifies the eUICC of the first accessory device 110. In some embodiments, the one or more identifiers for the second accessory device include a second EID that specifies the eUICC of the second accessory device 110 and a second international mobile equipment identifier (IMEI) that specifies the second accessory device 110. At action 9, the primary device 120 securely authenticates with each entitlement server 210 that a user of the first accessory device 110 and/or of the primary device 120 is authorized to transfer cellular service credentials for the specified first eSIMs from the first accessory device 110 to the second accessory device 150. In some embodiments, the primary device 120 provides authentication using background processes that include previously stored carrier authentication tokens obtained by the first accessory device 110 and subsequently accessed by the primary device 120. In some embodiments, the primary device 120 provides authentication by redirecting to web-sheet servers managed by the respective MNOs and by communicating information via web-sheet user interfaces with the respective web-sheet servers to demonstrate that a legitimate user of the first accessory device 110 and/or of the primary device 120 authorizes transfer of the cellular service credentials for the first eSIMs from the first accessory device 110 to the second accessory device 150. At action 10, upon successful user authentication, the entitlement servers 210 send eSIM assignment messages to the primary device 120. In some embodiments, the eSIM assignment messages include (i) second eICCIDs that specify second eSIMs to be installed in the second accessory device 150, and (ii) network addresses for MNO servers, e.g., for SM-DP+ servers 220. In some embodiments, the network addresses are URLs or FQDNs that the primary device 120 can use to access the SM-DP+ servers 220. At action 11, the second accessory device 150 connects securely to the SM-DP+ servers 220 indicated in the eSIM assignment message and downloads securely the second eSIMs associated with the second eICCIDs from the SM-DP+ servers 220. The primary device 120 can provide the URLs or FQDNs of the SM-DP+ servers 220 to the second accessory device 150. In some embodiments, the second accessory device 150 connects directly to the SM-DP+ servers 220 via a non-cellular access connection. In some embodiments, the second accessory device 150 connects to the SM-DP+ servers 220 via a cellular (or non-cellular) access connection established by the primary device 120, where the primary device 120 acts as a data conduit for the second accessory device 150. At action 12, the second accessory device 150 activates a selected eSIM, e.g., one corresponding to a previously active eSIM of the first accessory device. At action 13, the second accessory device 150 sends a confirmation to the corresponding entitlement server 210 of the MNO associated with the activated eSIM to indicate successful installation of the eSIM from the corresponding SM-DP+ server 220. At action 14, the entitlement server 210 enables cellular service for the second accessory device 150 based on the second eSIM installed and activated in the second accessory device 150 and disables cellular service associated with the first eSIM for the first accessory device 110.

Figure 4:
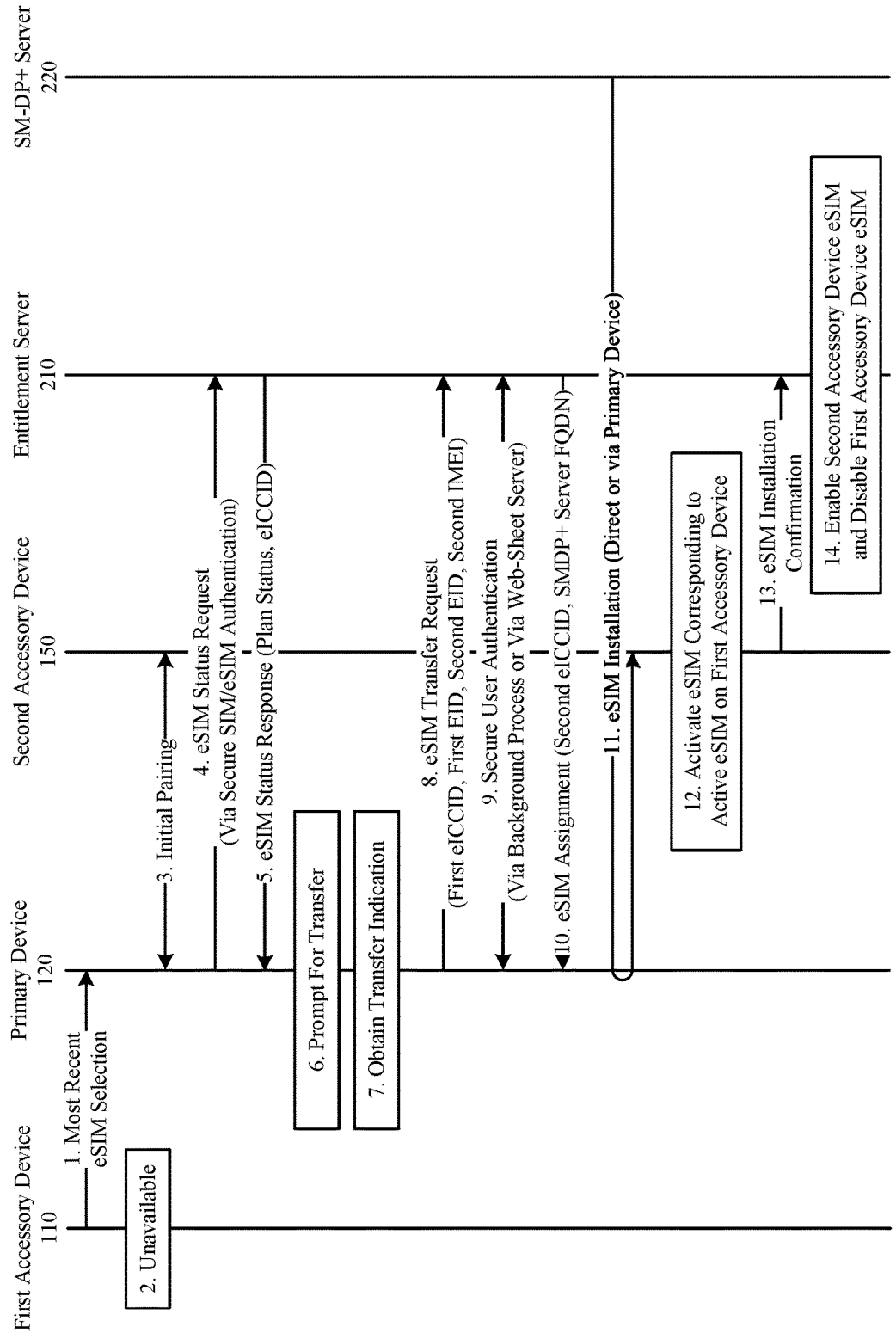

FIG. 4 illustrates a diagram 400 of an exemplary set of actions for transferring cellular service credentials for a most recently selected eSIM of a first accessory device 110 to a second accessory device 150 via a primary device 120. The first accessory device 110 can include multiple eSIMs associated with different MNOs, and the primary device 120 can include multiple SIM(s)/eSIM(s) that are also associated with different MNOs. The primary device 120 can be aware of a most recently selected eSIM for the first accessory device 110, as indicated by action 1. The selection may occur separate from configuring cellular service for the second accessory device 150. As indicated at action 2, the first accessory device 110 may be unavailable during configuration of cellular service for the second accessory device 150. At action 3, the second accessory device 150 pairs with the primary device 120 to establish a local, secure connection between the second accessory device 150 and the primary device 120. The primary device 120 may be used to configure the second accessory device 150, e.g., as part of an initial configuration or as part of a restore process. At action 4, the primary device 120 requests status for one or more eSIMs of accessory devices, e.g., for the first accessory device 110, that are linked with the primary device 120. The primary device 120 can use cellular service credentials associated with a SIM or eSIM installed in the primary device 120 to authenticate and communicate with an entitlement server 210 of the MNO. At action 5, the entitlement server 210 can send to the primary device 120, responsive to receipt of the request for eSIM status, an eSIM status response that includes cellular service plan status information for one or more eSIMs of associated accessory wireless devices, which includes the first accessory device 110. Status of an eSIM of the first accessory device 110 can be provided in the eSIM status response, and the eSIM of the first accessory device 110 can be identified uniquely based on an eICCID) included in the eSIM status response. At action 6, the primary device 120 presents information via a display or input/output of the primary device 120 that prompts a user to select whether to transfer an eSIM to the second accessory device 150. In some embodiments, an indicator for the eSIM most recently selected by the first accessory device 110 and are available to transfer to the second accessory device 150 is presented, e.g., by indicating an MSISDN or other identifier by which a user can determine the eSIM to be transferred to the second accessory device 150. At action 7, the primary device 120 obtains an indication to transfer the most recently selected eSIM to the second accessory device 150. At action 8, the primary device 120 sends to the entitlement server 210 an eSIM transfer request that includes one or more identifiers for the first accessory device 110 and one or more identifiers for the second accessory device 150. In some embodiments, the one or more identifiers for the first accessory device 110 include a first eICCID that specifies the first (most recently selected) eSIM of the first accessory device 110 and a first EID that specifies the eUICC of the first accessory device 110. In some embodiments, the one or more identifiers for the second accessory device include a second EID that specifies the eUICC of the second accessory device 110 and a second IMEI that specifies the second accessory device 110. At action 9, the primary device 120 securely authenticates that a user of the first accessory device 110 and/or of the primary device 120 is authorized to transfer cellular service credentials for the specified first eSIM from the first accessory device 110 to the second accessory device 150. In some embodiments, the primary device 120 provides authentication using a background process that includes a previously stored carrier authentication token obtained by the first accessory device 110 and subsequently accessed by the primary device 120. In some embodiments, the primary device 120 provides authentication by redirecting to a web-sheet server managed by the MNO associated with the first eSIM and by communicating information via a web-sheet user interface with the web-sheet server to demonstrate that a legitimate user of the first accessory device 110 and/or of the primary device 120 authorizes transfer of the cellular service credentials for the first eSIM from the first accessory device 110 to the second accessory device 150. At action 10, upon successful user authentication, the entitlement server 210 sends an eSIM assignment message to the primary device 120. In some embodiments, the eSIM assignment message includes (i) a second eICCID that specifies a second eSIM to be installed in the second accessory device 150, and (ii) a network address for an MNO server, e.g., for an SM-DP+ server 220. In some embodiments, the network address is a URL or a FQDN that the primary device 120 can use to access the SM-DP+ server 220. At action 11, the second accessory device 150 connects securely to the SM-DP+ server 220 indicated in the eSIM assignment message and downloads securely the second eSIM associated with the second eICCID from the SM-DP+ server 220. The primary device 120 can provide the URL or FQDN of the SM-DP+ server 220 to the second accessory device 150. In some embodiments, the second accessory device 150 connects directly to the SM-DP+ server 220 via a non-cellular access connection. In some embodiments, the second accessory device 150 connects to the SM-DP+ server 220 via a cellular (or non-cellular) access connection established by the primary device 120, where the primary device 120 acts as a data conduit for the second accessory device 150. At action 12, the second accessory device 150 activates the second eSIM, which corresponds to the most recently selected (first) eSIM of the first accessory device. At action 13, the second accessory device 150 sends a confirmation to the corresponding entitlement server 210 of the MNO associated with the activated eSIM to indicate successful installation of the second eSIM from the corresponding SM-DP+ server 220. At action 14, the entitlement server 210 enables cellular service for the second accessory device 150 based on the second eSIM installed and activated in the second accessory device 150 and disables cellular service associated with the first eSIM for the first accessory device 110.

Figure 5A:
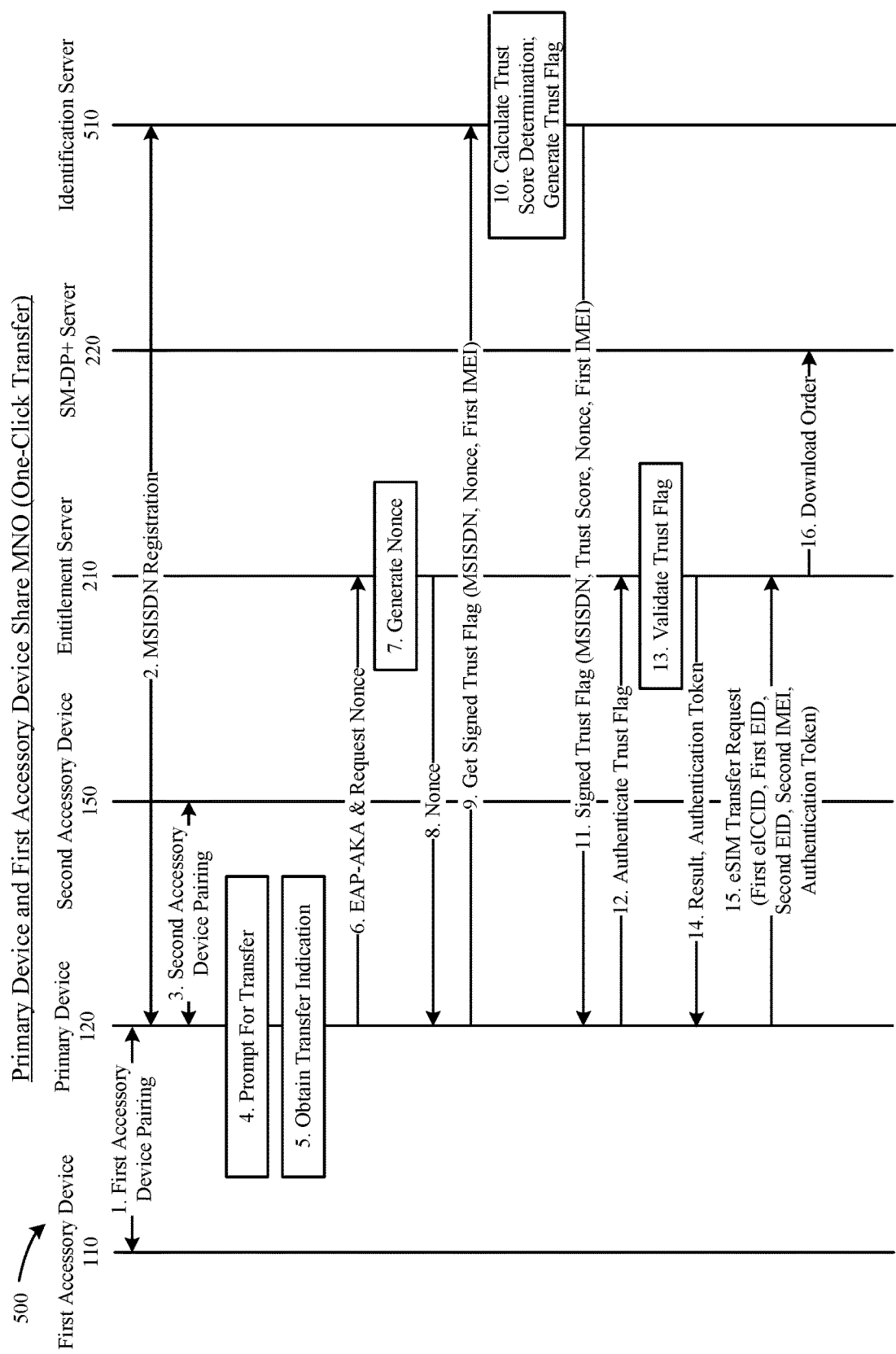
FIGS. 5A and 5B illustrate another exemplary set of actions for transferring cellular service credentials for an eSIM from a first accessory device to a second accessory device via a primary device that shares an MNO with the first accessory device, according to some embodiments.
Figure 5B:
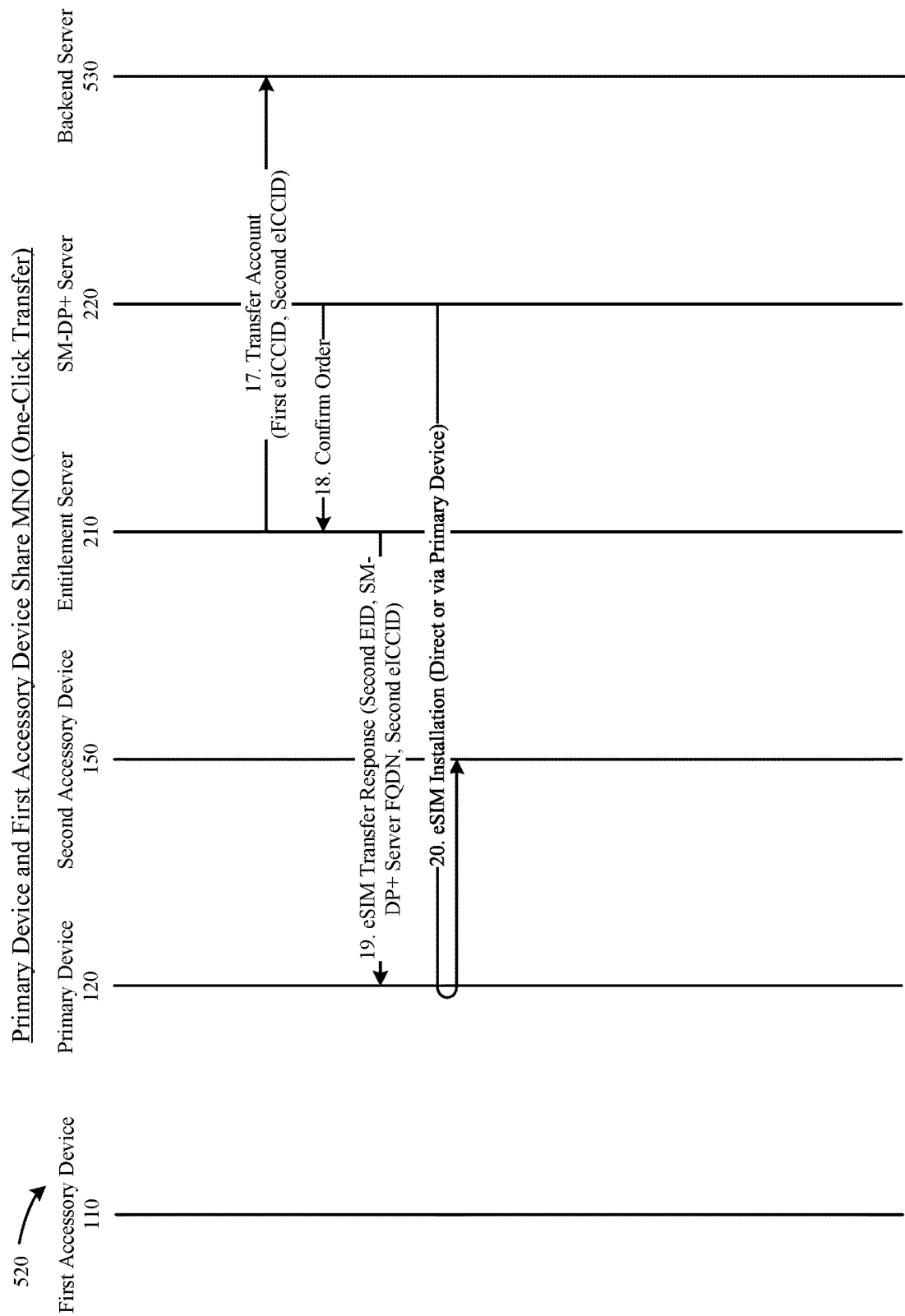

FIGS. 5A and 5B illustrate diagrams 500, 520 of another exemplary set of actions for transferring cellular service credentials for an eSIM from a first accessory device 110 to a second accessory device 150 via a primary device 120 that shares an MNO with the first accessory device 110. The primary device 120 and the first accessory device 110, from which the cellular service credentials will be transferred, shared a common MNO, with which the primary device 120 can authenticate and communicate using its own SIM/eSIM. The exemplary set of actions in FIGS. 5A and 5B provide an efficient "one-click transfer" procedure to move cellular service credentials from the first accessory device 110 to the second accessory device 150. At action 1, the first accessory device 110 pairs with the primary device 120. In some embodiments, during or associated with the pairing, the first accessory device 110 obtains or activates a first eSIM in an eUICC of the first accessory device 110 to allow access to cellular wireless services. In some embodiments, the first eSIM is identified by a unique first eICCID value but shares a common MSISDN value with a SIM/eSIM of the primary device 120. In some embodiments, the first eSIM is associated with a distinct MSISDN value from those of the SIM(s)/eSIM(s) of the primary device 120. The first eSIM of the first accessory device 110 and at least one SIM/eSIM of the primary device 120 share a common MNO. At action 2, the primary device 110 registers the MSISDN of the first accessory device 110 with an identification server 510, which can be managed by a non-MNO third party and can associate a non-MNO user account with various devices, including the primary device 120 and the first accessory device 110. The identification server 510 can be used to maintain a trust score for authenticating a user of a set of devices. The identification server 510 can use a history of a user, a history of a user's devices, and one or more associated user accounts to determine whether certain transactions require further authentication, e.g., via a login with an MNO web-sheet server, or whether a user can be authenticated for the transactions based on the trust score. Using a trust score evaluation for authentication can bypass additional steps to communicate with the MNO web-sheet server thereby shortening the process to transfer cellular service credentials, particularly during configuration or restoration of the second accessory device 150. At action 3, the second accessory device 150 pairs with the primary device 120. Initially (or as part of a restoration process), the second accessory device 150 can have no active eSIMs on the eUICC of the second accessory device 150. As part of configuration or restoration of the second accessory device 150, the primary device 120, at action 4, can present options for configuring cellular service for the second accessory device 150, e.g., as shown in diagram 100 of FIG. 1. The primary device 120 can display a prompt to determine whether a user seeks to transfer cellular service credentials from another device, e.g., from the first accessory device 110, to the second accessory device 150. At action 5, the primary device 120 obtains an indication via an input/output of the primary device 120 to transfer cellular service credentials for one or more eSIMs, e.g., the first eSIM, from the first accessory device 110 to the second accessory device 150. At action 6, the primary device 120 performs an Extensible Authentication Protocol Authentication and Key Agreement (EAP-AKA) procedure to authenticate and establish a secure connection with an entitlement server 210 of an MNO associated with a SIM/eSIM of the primary device and also associated with the first eSIM of the first accessory device 110. At action 7, the entitlement server 210 generates a nonce value and, at action 8, sends the nonce value to the primary device 120. At action 9, the primary device 120 sends, to the identification server 510, an authentication request (Get Signed Trust Flag) to obtain a trust score from the identification server 510. The authentication request includes the MSISDN value of the primary device 120 (which in some embodiments, can be also shared with the first accessory device 110), the nonce provided by the entitlement server 210, and a first IMEI value for the primary device 120. The authentication request can be signed by the primary device 120 using a secure private key. At action 10, the identification server 510 can perform a security evaluation and determine a trust score based at least in part on information provided by the primary device 120. In some embodiments, the primary device 120 provides an identity for an account maintained by the identification server 510 for a user of the primary device 120 and the first accessory device 110. The identification server 510 can use information maintained by the identification server 510 and/or accessible to the identification server 510 to generate the trust score. Exemplary information includes a history of associates of the MSISDN or other credentials with the user, with the primary device 120, and/or with the first accessory device 110. In some embodiments, the identification server 510 queries additional servers (not shown) to obtain information to generate the trust score. Based on accessible information, the identification server 510 generates a trust flag. At action 11, the identification server 510 sends to the primary device a signed trust flag message, which includes the MSISDN value, the generated trust score, the nonce, and the first IMEI value for the primary device 120. At action 12, the primary device 120 uses the signed trust flag message (and/or information contained therein) to authenticate with the entitlement server 210 for subsequent transfer of cellular service credentials from the first accessory device 110 to another device, e.g., to the second accessory device 150. In some embodiments, the trust flag authentication proves to the entitlement server 210 that a user of the primary device 120 and the first accessory device 110 has authority to install, delete, and/or modify cellular service credentials for the first accessory device 110, e.g., for transfer to the second accessory device 150. At action 13, the entitlement server 210 validates the trust flag, and at action 14, provides an indication of the trust flag validation to the primary device 120. Upon successful validation, the entitlement server 210 also provides, at action 14, an authentication token that the primary device 120 can use to authorize transfer of cellular service credentials from the first accessory device 110 for the first eSIM to the second accessory device 150. At action 15, the primary device 120 sends an eSIM transfer request to the entitlement server 210, the eSIM transfer request including a first eICCID identifier of the first eSIM of the first accessory device 110, a first EID identifier of the eUICC of the first accessory device 110, a second EID identifier of the eUICC of the second accessory device 150, a second IMEI of the second accessory device 150, and the authentication token obtained from the entitlement server 210. At action 16, the entitlement server 210 submits an order to the SM-DP+server 220 to download an eSIM for the second accessory device 150. At action 17, the entitlement server 210 further communicates a transfer message to an MNO backend server 530 to cause the cellular service account associated with the first eSIM for the first accessory device 110 to transfer to the second accessory device 150. The transfer message can include the first eICCID of the first eSIM of the first accessory device 110 and a second eICCID for a second eSIM to be installed in the second accessory device 150. At action 18, the SM-DP+server 220 confirms the download order to the entitlement server 210. At action 19, the entitlement server 210 responds to the transfer request from the primary device 120 with an eSIM transfer response indicating approval for the cellular service credentials to be transferred from the first accessory device 110 to the second accessory device 150. The eSIM transfer response can include the second EID of the second accessory device 150, the second eICCID for the second eSIM to be installed in the second accessory device 150, and a network address, e.g., a URL or FQDN for the SM-DP+ server 220 from which the second eSIM can be downloaded. At action 20, the second accessory device 150 downloads the second eSIM from the SM-DP+ server 220. The primary device 120 can provide the URL or FQDN of the SM-DP+ server 220 to the second accessory device 150. In some embodiments the second accessory device 150 connects directly to the SM-DP+ server 220 via a non-cellular access connection. In some embodiments, the second accessory device 150 connects to the SM-DP+ server 220 via a cellular (or non-cellular) access connection established by the primary device 120, where the primary device 120 acts as a data conduit for the second accessory device 150.

Figure 6:
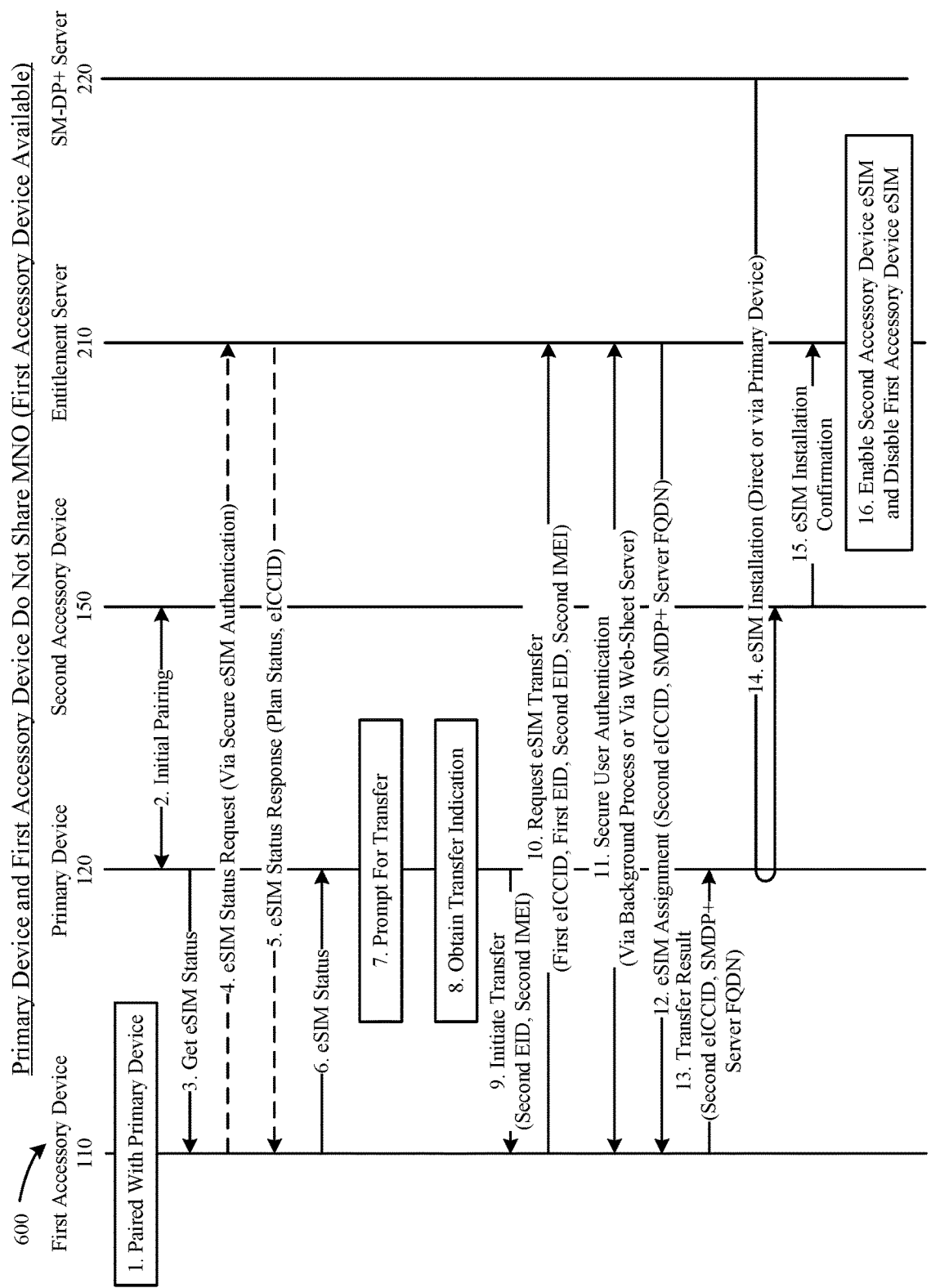
FIGS. 6 and 7 illustrate exemplary sets of actions for transferring cellular service credentials for an eSIM from a first accessory device to a second accessory device via a primary device that does not share an MNO with the first accessory device, according to some embodiments.

FIG. 6 illustrates a diagram 600 of an exemplary set of actions for transferring cellular service credentials for an eSIM from a first accessory device 110 to a second accessory device 150 via a primary device 120 that does not share an MNO with the first accessory device 110. As the primary device 120 does not include a SIM/eSIM with which to authenticate with an MNO server, e.g., entitlement server 210, for a first eSIM of the first accessory device 110 that a user seeks to transfer to the second accessory device 150, the primary device 120 uses the first accessory device 110 to authenticate and communicate with the applicable MNO servers 220 during the transfer process. At action 1, the first accessory device can be paired with the primary device 120 via a secure connection and can be available for communication with one or more MNO servers. At action 2, the primary device 120 pairs with the second accessory device 150, e.g., as part of an initial configuration and/or restoration process of the second accessory device 150. At action 3, the primary device 120 sends to the first accessory device 110 a request for status of eSIMs of the first accessory device 110. In some embodiments, that first accessory device 110, at action 4, sends a request for eSIM status to the entitlement server 210 of an MNO associated with one or more eSIMs of the first accessory device 110. In some embodiments, the eSIMs of the first accessory device 110 are associated with two or more MNOs, and the first accessory device 110 can request status from respective entitlement servers 210 of one or more of the two or more MNOs. The first accessory device 110 can user cellular service credentials associated with the eSIMs stored in the eUICC of the first accessory device 110 to authenticate with the entitlement server(s) 210. The entitlement server(s) 210 can respond, at action 5, with cellular service plan status information for the eSIMs of the first accessory device 110. The eSIMs can be identified uniquely based on eICCID values included in the eSIM status response message from the entitlement server 210. Communication with the entitlement server 210 at actions 4 and 5 by the first accessory device 110 can be optional, in some embodiments. At action 6, the first accessory device 110 responds to the request by providing the status of eSIMs of the first accessory device 110 to the primary device 120. At action 7, the primary device 120 presents information via a display or input/output of the primary device 120 that prompts a user to select whether to transfer one or more eSIMs to the second accessory device 150. In some embodiments, indicators for eSIMs that are available to transfer to the second accessory device 150 are presented, while any eSIMs that are not available to transfer are not indicated. In some embodiments, an indication of a particular eSIM to transfer is provided, e.g., by indicating a particular MSISDN or other identifier by which a user can determine which cellular service credentials may be transferred to the second accessory device 150. At action 8, the primary device 120 obtains an indication to transfer at least one eSIM of the one or more eSIMs available to transfer to the second accessory device 150. At action 9, the primary device 120 sends a message to the first accessory device 110 to initiate transfer of the indicated eSIM(s) from the first accessory device 110 to the second accessory device 150. The message can include a second EID that uniquely identifies an eUICC of the second accessory device 150 and a second IMEI that uniquely identifies the second accessory device 150. At action 10, the first accessory device 110 sends to the entitlement server 210 an eSIM transfer request that includes one or more identifiers for the first accessory device 110 and one or more identifiers for the second accessory device 150. In some embodiments, the one or more identifiers for the first accessory device 110 include a first eICCID that specifies a first eSIM of the first accessory device 110 and a first EID that specifies the eUICC of the first accessory device 110. In some embodiments, the one or more identifiers for the second accessory device include a second EID that specifies the eUICC of the second accessory device 110 and a second IMEI that specifies the second accessory device 110. At action 11, the first accessory device 110 securely authenticates that a user of the first accessory device 110 and/or of the primary device 120 is authorized to transfer cellular service credentials for the specified first eSIM from the first accessory device 110 to the second accessory device 150. In some embodiments, the first accessory device 110 provides authentication using a background process that includes a previously stored carrier authentication token obtained by the first accessory device 110. In some embodiments, the first accessory device 110 provides authentication by redirecting to a web-sheet server managed by the MNO and by communicating information via a web-sheet user interface with the web-sheet server to demonstrate that a legitimate user of the first accessory device 110 and/or of the primary device 120 authorizes transfer of the cellular service credentials for the first eSIM from the first accessory device 110 to the second accessory device 150. At action 12, upon successful user authentication, the entitlement server 210 sends an eSIM assignment message to the first accessory device 110. In some embodiments, the eSIM assignment message includes (i) a second eICCID that specifies a second eSIM to be installed in the second accessory device 150, and (ii) a network address for an MNO server, e.g., for an SM-DP+ server 220. In some embodiments, the network address is a URL or FQDN that the primary device 120 can use to access the SM-DP+ server 220. At action 13, the first accessory device 110 provides a transfer result message to the primary device 120, the transfer result message including the second eICCID that specifies the second eSIM to be downloaded to the second accessory device 150 and the network address, e.g., a URL or FQDN, for the SM-DP+ server 220 from which to download the second eSIM for the second accessory device 150. At action 14, the second accessory device 150 connects securely to the SM-DP+ server 220 indicated in the transfer result message and downloads securely the second eSIM associated with the second eICCID from the SM-DP+ server 220. The primary device 120 can provide the URL or FQDN of the SM-DP+ server 220 to the second accessory device 150. In some embodiments, the second accessory device 150 connects directly to the SM-DP+ server 220 via a non-cellular access connection. In some embodiments, the second accessory device 150 connects to the SM-DP+ server 220 via a cellular (or non-cellular) access connection established by the primary device 120, where the primary device 120 acts as a data conduit for the second accessory device 150. At action 15, the second accessory device 150 sends a confirmation to the entitlement server 210 of the MNO to indicate successful installation of the second eSIM from the SM-DP+ server 220. At action 16, the entitlement server 210 enables cellular service for the second accessory device 150 based on the second eSIM and disables cellular service for the first accessory device 110 based on the first eSIM.

Figure 7:
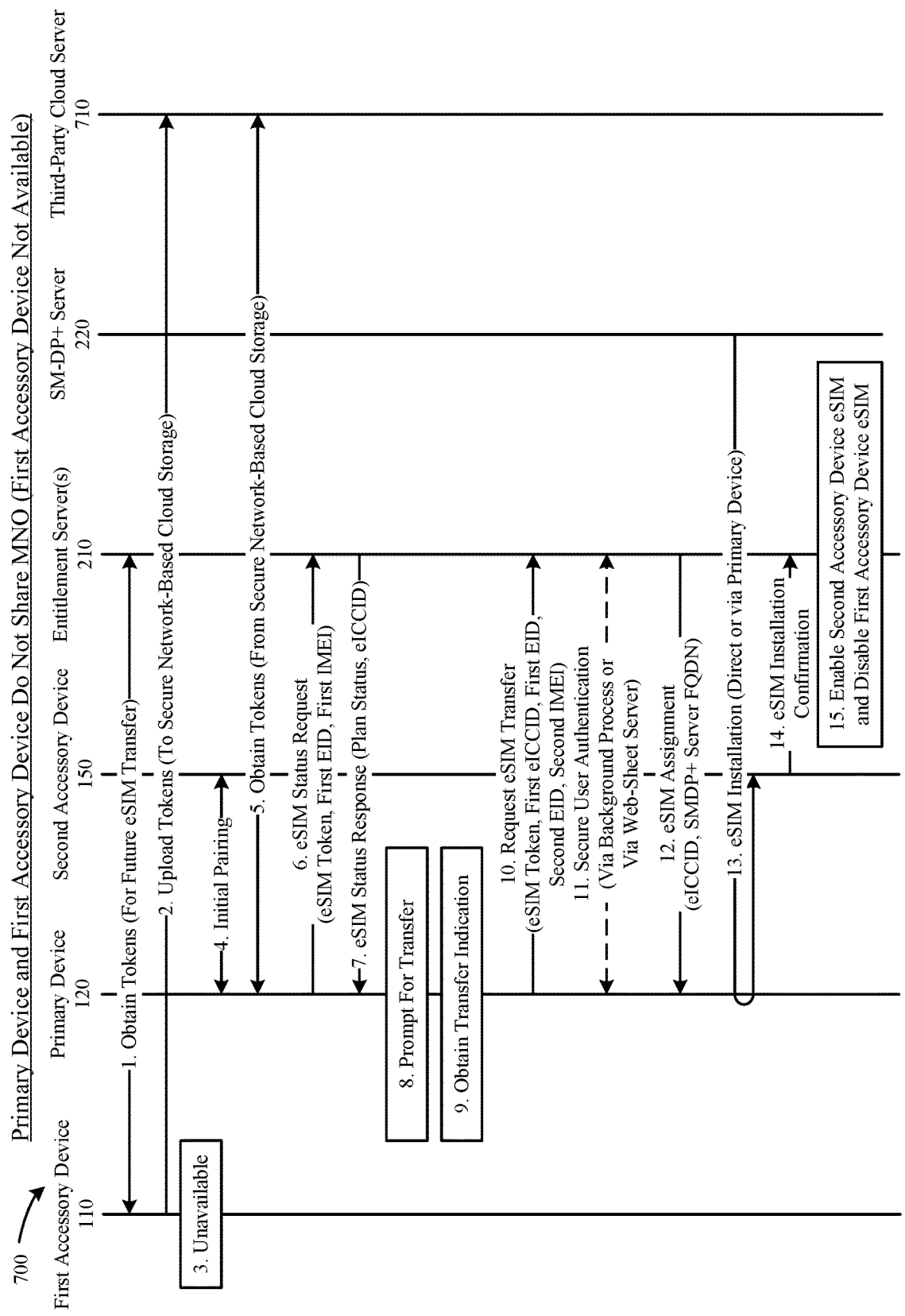

FIG. 7 illustrates a diagram 700 of another exemplary set of actions for transferring cellular service credentials for an eSIM from a first accessory device 110 to a second accessory device 150 via a primary device 120 that does not share an MNO with the first accessory device 110. Unlike the scenario illustrated by FIG. 6, the first accessory device 110 may be not available during the configuration of the second accessory device 150 by the primary device 120. As with the scenario of FIG. 7, the primary device 120 does not include a SIM/eSIM with which to authenticate with an MNO server, e.g., entitlement server 210, for a first eSIM of the first accessory device 110 that a user seeks to transfer to the second accessory device 150, the primary device 120 uses the first accessory device 110 to authenticate and communicate with the applicable MNO servers 220 during the transfer process. Instead, the primary device 120 can use an authentication token previously obtained by the first accessory device 110 and accessible to the primary device 120. At action 1, the first accessory device 110 obtains one or more authentication tokens for one or more eSIMs from respective entitlement servers 210, where the authentication tokens can be used at a future time for authentication with the entitlement servers 210. At action 2, the first accessory device uploads one or more of the obtained authentication tokens to a third-part cloud network based serer 710 for secure storage and subsequent retrieval by the first accessory device 110 or by another associated device, e.g., the primary device 120. As indicated at action 3, the first accessory device 110 can be not available for participation during transfer of one or more eSIMs from the first accessory device 110 to the second accessory device 150. At action 4, the second accessory device 150 pairs with the primary device, e.g., as part of a configuration or restoration process. At action 5, the primary device obtains one or more authentication tokens from secure network-based cloud storage, e.g., from the third-party cloud server 710. In some embodiments, the primary device 120 and the first accessory device 110 are associated with a common non-MNO user account, e.g., with an Apple ID account, and the primary device 120 authenticates with the third-party cloud server 710 based on credentials associated with the non-MNO user account. At action 6, the primary device 120 sends a request for eSIM status to the entitlement server 210 of an MNO associated with one or more eSIMs of the first accessory device 110. In some embodiments, the eSIMs of the first accessory device 110 are associated with two or more MNOs, and the primary device 120 can request status from respective entitlement servers 210 of one or more of the two or more MNOs. The primary device 120 can use one or more of the authentication tokens obtained from the third-party cloud server 710 (indicated in FIG. 7 as eSIM tokens) to authenticate with the entitlement server(s) 210. The eSIM status request(s) can also include a first EID for the eUICC of the first accessory device 110 and a first IMEI value for the first accessory device 110. The entitlement server 210 can respond, at action 7, with cellular service plan status information for one or more eSIMs of the first accessory device 110. The one or more eSIMs can be identified uniquely based on eICCID values included in the eSIM status response message from the entitlement server 210. At action 8, the primary device 120 presents information via a display or input/output of the primary device 120 that prompts a user to select whether to transfer one or more eSIMs to the second accessory device 150. In some embodiments, indicators for eSIMs that are available to transfer to the second accessory device 150 are presented, while any eSIMs that are not available to transfer are not indicated. In some embodiments, an indication of a particular eSIM to transfer is provided, e.g., by indicating a particular MSISDN or other identifier by which a user can determine which cellular service credentials may be transferred to the second accessory device 150. At action 9, the primary device 120 obtains an indication to transfer at least one eSIM of the one or more eSIMs available to transfer to the second accessory device 150. At action 10, the primary device 120 sends to the entitlement server 210 an eSIM transfer request that includes an eSIM token (for authentication), one or more identifiers for the first accessory device 110 and one or more identifiers for the second accessory device 150. In some embodiments, the one or more identifiers for the first accessory device 110 include a first eICCID that specifies a first eSIM of the first accessory device 110 and a first EID that specifies the eUICC of the first accessory device 110. In some embodiments, the one or more identifiers for the second accessory device include a second EID that specifies the eUICC of the second accessory device 110 and a second IMEI that specifies the second accessory device 110. At action 11, optionally, the primary device 120 securely authenticates that a user of the first accessory device 110 and/or of the primary device 120 is authorized to transfer cellular service credentials for the specified first eSIM from the first accessory device 110 to the second accessory device 150. In some embodiments, the primary device 120 provides authentication using a background process that includes a previously stored carrier authentication token obtained by the primary device 120. In some embodiments, the primary device 120 provides authentication by redirecting to a web-sheet server managed by an applicable MNO and by communicating information via a web-sheet user interface with the web-sheet server to demonstrate that a legitimate user of the first accessory device 110 and/or of the primary device 120 authorizes transfer of the cellular service credentials for the first eSIM from the first accessory device 110 to the second accessory device 150. At action 12, the entitlement server 210 sends an eSIM assignment message to the primary device 120, the eSIM assignment message including (i) a second eICCID that specifies a second eSIM to be installed in the second accessory device 150, and (ii) a network address for an MNO server, e.g., for an SM-DP+ server 220. In some embodiments, the network address is a URL or FQDN that the primary device 120 can use to access the SM-DP+ server 220. At action 13, the second accessory device 150 connects securely to the SM-DP+ server 220 indicated in the transfer result message and downloads securely the second eSIM associated with the second eICCID from the SM-DP+ server 220. The primary device 120 can provide the URL or FQDN of the SM-DP+ server 220 to the second accessory device 150. In some embodiments, the second accessory device 150 connects directly to the SM-DP+ server 220 via a non-cellular access connection. In some embodiments, the second accessory device 150 connects to the SM-DP+ server 220 via a cellular (or non-cellular) access connection established by the primary device 120, where the primary device 120 acts as a data conduit for the second accessory device 150. At action 14, the second accessory device 150 sends a confirmation to the entitlement server 210 of the MNO to indicate successful installation of the second eSIM from the SM-DP+ server 220. At action 15, the entitlement server 210 enables cellular service for the second accessory device 150 based on the second eSIM and disables cellular service for the first accessory device 110 based on the first eSIM.

Figure 8A:
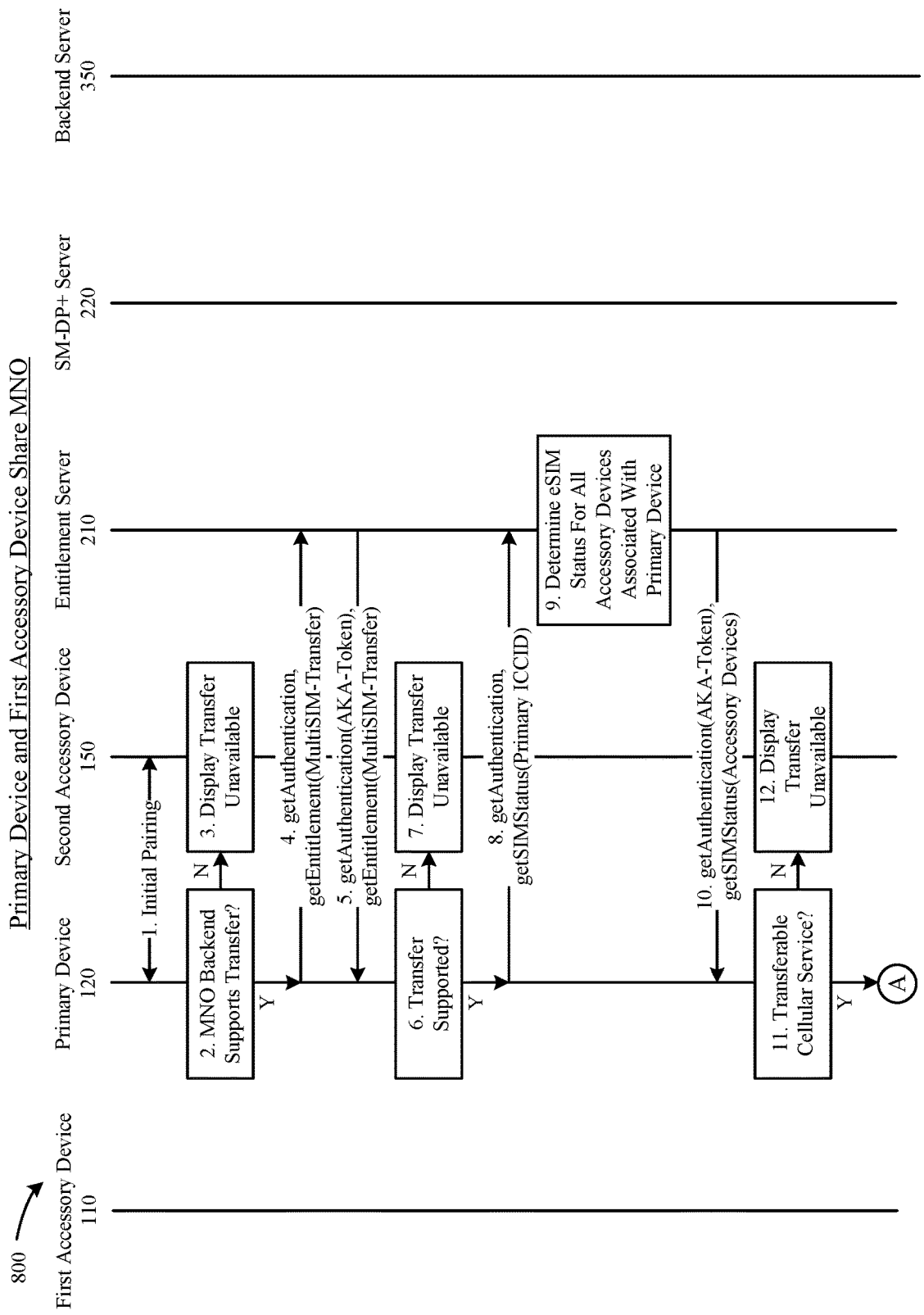
FIGS. 8A, 8B, and 8C illustrate another exemplary set of actions for transferring cellular service credentials for an eSIM from a first accessory device to a second accessory device via a primary device that shares an MNO with the first accessory device, according to some embodiments.
Figure 8B:
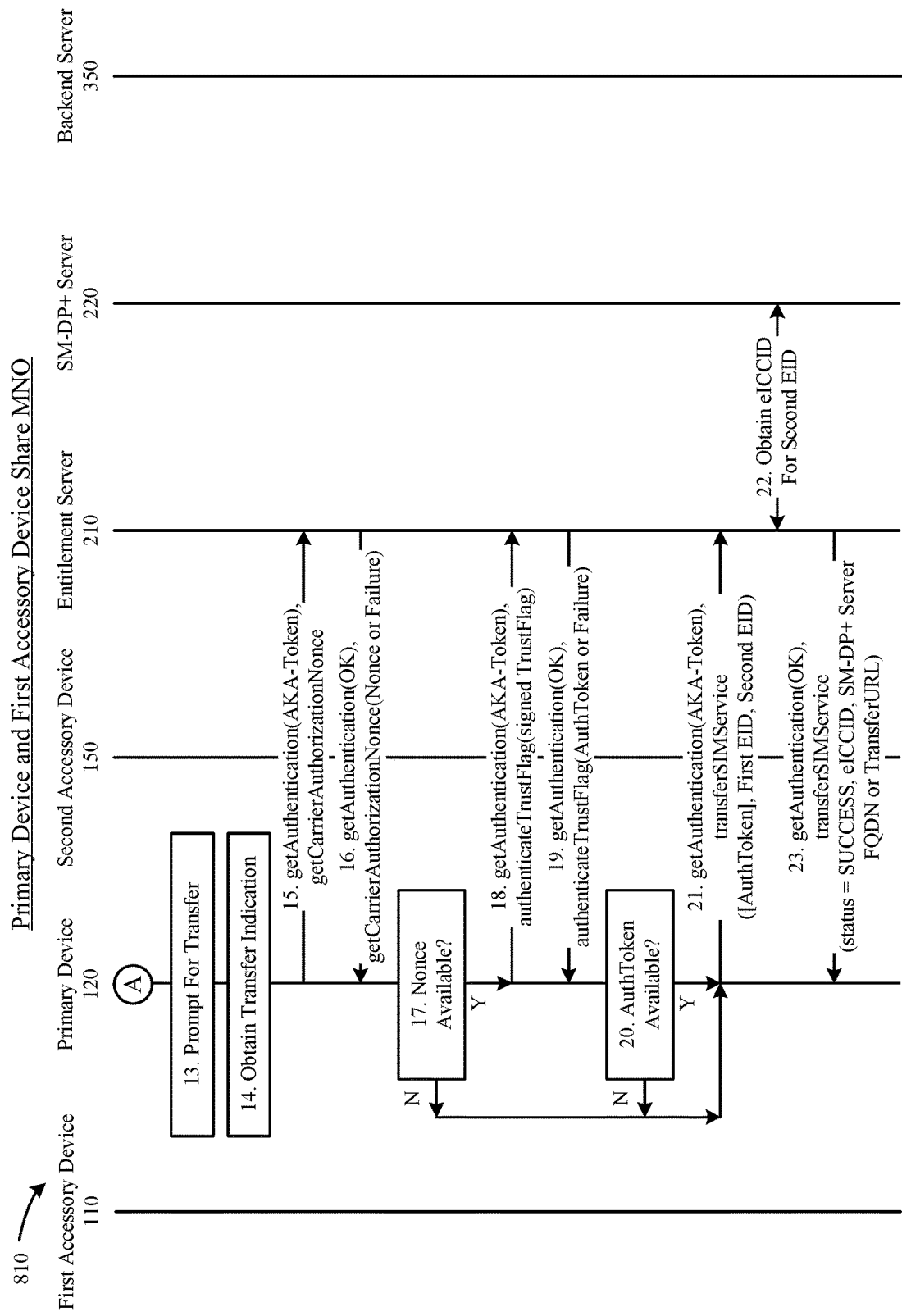
Figure 8C:
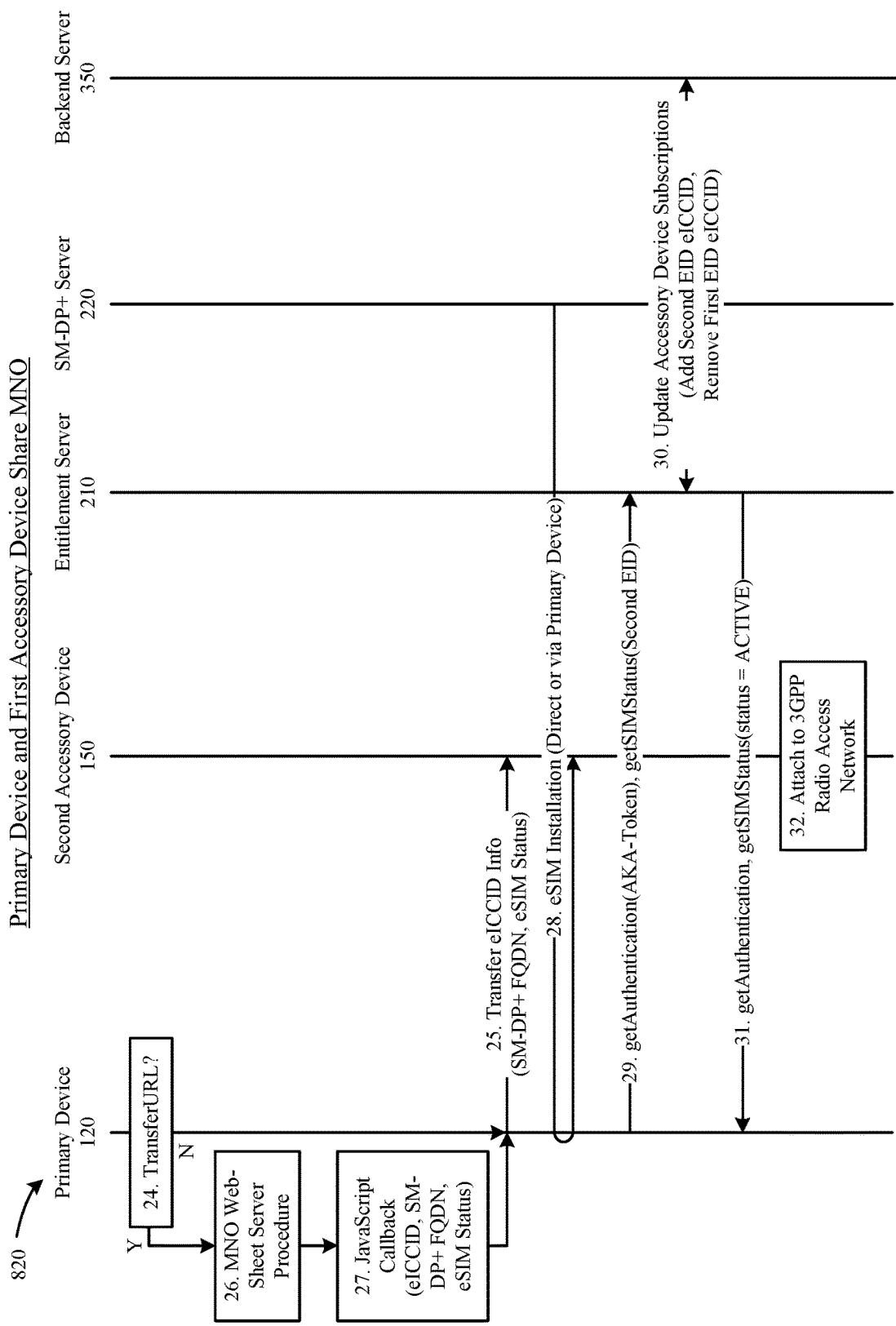

FIGS. 8A, 8B, and 8C illustrate diagrams 800, 810, 820 of another exemplary set of actions for transferring cellular service credentials for an eSIM from a first accessory device 110 to a second accessory device 150 via a primary device 120 that shares an MNO with the first accessory device 110. The first accessory device 110 was previously (or is currently) associated with the primary device 120 but is unavailable to participate in the transfer process. In some embodiments, the primary device 120 and the first accessory device 110 share a common cellular service account managed by the MNO. In some embodiments, the primary device 120 and the first accessory device 110 use separate cellular service accounts that are linked together and billed to a common user. In some embodiments, the primary device 120 and the first accessory device 110 use an identical mobile station international subscriber directory number (MSISDN). In some embodiments, the primary device 120 and the first accessory device 110 use distinct MSISDNs. At action 1, the second accessory device 150 pairs with the primary device 120 to establish a local, secure connection between the second accessory device 150 and the primary device 120. The primary device 120 may be used to configure the second accessory device 150, e.g., as part of an initial configuration or as part of a restore process. At action 2, the primary device 120 determines whether MNO back-end servers support transfer of one or more eSIMs from the first accessory device 110 to the second accessory device 150. When transfer is not available, at action 3, the second accessory device 150 presents via a display an indication that transfer of cellular service credentials is unavailable. When transfer is available, at action 4, the primary device 120 sends an authentication/entitlement message to the entitlement server 210 to obtain information regarding transferability of one or more eSIMs from the first accessory device 110 to the second accessory device 150. At action 5, the primary device 120 receives an authentication/entitlement response that includes information regarding transferability of the one or more eSIMs and an authentication and key agreement (AKA) token. At action 6, the primary device 120 determines based at least in part on information received from the entitlement server 210 whether transfer of one or more eSIMs are supported. When transfer is not supported, at action 7, the second accessory device 150 presents via a display an indication that transfer of cellular service credentials is unavailable. When transfer is supported, at action 8, the primary device 120 requests status for one or more eSIMs of accessory devices, e.g., for the first accessory device 110, that are linked with the primary device 120. The primary device 120 can use cellular service credentials associated with a SIM or eSIM installed in the primary device 120 to authenticate and communicate with an entitlement server 210 of the MNO. In some embodiments, the eSIM status request can include an ICCID for a SIM/eSIM of the primary device 120. At action 9, the entitlement server 210 determines status for one or more eSIMs of one or more accessory devices that are associated with the primary device 120, which can include the first accessory device 110. At action 10, the entitlement server 210 can send to the primary device 120, responsive to receipt of the request for eSIM status, an eSIM status response message that includes cellular service plan status information for one or more eSIMs of associated accessory wireless devices, which includes the first accessory device 110. In some embodiments, the eSIMs, for which status is provided, can be uniquely identified by eICCID values included in the eSIM status response message. At action 11, the primary device 120 determines whether there are one or more cellular service plans for which associated cellular service credentials can be transferred to the second accessory device 150. When no cellular service plans can be transferred, at action 12, the second accessory device 150 presents via a display an indication that transfer of cellular service credentials is unavailable. When at least transferable cellular service plan is available, at action 13, the primary device 120 presents information via a display or input/output of the primary device 120 that prompts a user to select whether to transfer one or more eSIMs to the second accessory device 150. In some embodiments, indicators for eSIMs that are available to transfer to the second accessory device 150 are presented, while any eSIMs that are not available to transfer are not indicated. In some embodiments, an indication of a particular eSIM to transfer is provided, e.g., by indicating a particular MSISDN or other identifier by which a user can determine which cellular service credentials may be transferred to the second accessory device 150. At action 14, the primary device 120 obtains an indication to transfer at least one eSIM of the one or more eSIMs available to transfer to the second accessory device 150. At action 15, the primary device 120 sends to the entitlement server 210 an authentication message that includes the AKA token received at action 5 and a request for a carrier authorization nonce from the entitlement server 210. At action 16, the entitlement server 210 responds with a nonce, when authentication with the AKA token succeeds, or a failure indication, when authentication with the AKA token fails. At action 17, the primary device 120 determines whether a nonce was received, and when the nonce is received, at action 18, the primary device 120 sends a message to the entitlement server 210 that includes the previously obtained AKA token and a signed Trust Flag message to authenticate a user of the primary device 120 and the first accessory device 110 for transferring cellular service credentials from the first accessory device 110 to the second accessory device 150. At action 19, the entitlement server 210 responds to the message with an authentication token or a failure indication. At action 20, the primary device determines whether an authentication token was received. At action 21, the primary device 21 sends a request to transfer cellular service credentials for at least one eSIM of the first accessory device 110 to the second accessory device 150. The request includes a previously obtained AKA token and when available the authentication token. The request also includes a first EID that specifies the eUICC of the first accessory device 110, and a second EID that specifies an eUICC of the second accessory device 150. At action 22, the entitlement server 210 obtains, from an SM-DP+ server 220, an eICCID that identifies a second eSIM to install on the eUICC of the second accessory device 150 specified by the second EID. At action 23, the entitlement server 210 sends a transfer message that indicates success to transfer cellular service credentials for the first eSIM of the first accessory device 110 to the second eSIM (yet to be installed) of the second accessory device 150. The transfer message includes, when authentication using the Trust Flag was previously successful (and the authentication token was provided at action 19, (i) an eICCID value that specifies the second eSIM and (ii) a network address for the SM-DP+ server 220 from which to download the second eSIM. Alternatively, when the Trust Flag was not successful (and a failure message was provided at action 19), the entitlement server 210 provides a URL for a web-sheet server with which the primary device can authenticate, e.g., using a web-sheet interface, and subsequently execute a JavaScript callback procedure to obtain the transfer information. At action 24, the primary device determines whether a transfer URL was provided at action 23. When no transfer URL was provided (indicating additional authentication via a web-sheet server is not required), the primary device 120 provides to the second accessory device 150 a transfer information message that includes, in some embodiments, a URL or FQDN for the SM-DP+ server 220 and a status of one or more eSIMs. When a transfer URL was provided (indicating additional authentication is required), the primary device 120, at actions 26 and 27 executes an MNO web-sheet server procedure (connecting based on the provided transfer URL) and subsequently executes a JavaScript callback process to further authenticate a user with the MNO for transfer of the cellular service credentials. After the MNO web-sheet procedure of action 26 and as part of the JavaScript callback procedure of action 27, the primary device obtains the (i) eICCID value that specifies the second eSIM and (ii) the network address for the SM-DP+ server 220 from which to download the second eSIM. At action 28, the second accessory device 150 downloads from the SM-DP+ server 220 the second eSIM. The primary device 120 can provide the URL or FQDN of the SM-DP+ server 220 to the second accessory device 150. In some embodiments, the second accessory device 150 connects directly to the SM-DP+ server 220 via a non-cellular access connection. In some embodiments, the second accessory device 150 connects to the SM-DP+ server 220 via a cellular (or non-cellular) access connection established by the primary device 120, where the primary device 120 acts as a data conduit for the second accessory device 150. At action 29, the primary device 120 provides to the entitlement server 210 a status of installation of the second eSIM on the eUICC of the second accessory device 150. The status can include the second EID of the eUICC of the second accessory device. At action 30, the entitlement server 210 provides an accessory device subscription update message to the MNO backend server 350, the message indicating that the eICCID value of the second eSIM installed on the eUICC of the second accessory device 150 should be added to the subscription, while the eICCID value of the first eSIM previously installed on the eUICC of the first accessory device 110 should be removed. At action 31, the entitlement server 210 provides to the primary device 120 a status message that indicates that the second eSIM installed on the eUICC of the second accessory device 150 is active. At action 32, the second accessory device can attach to a 3GPP radio access network using the cellular service credentials of the second eSIM installed on the eUICC of the second accessory device 150.

Figure 9:
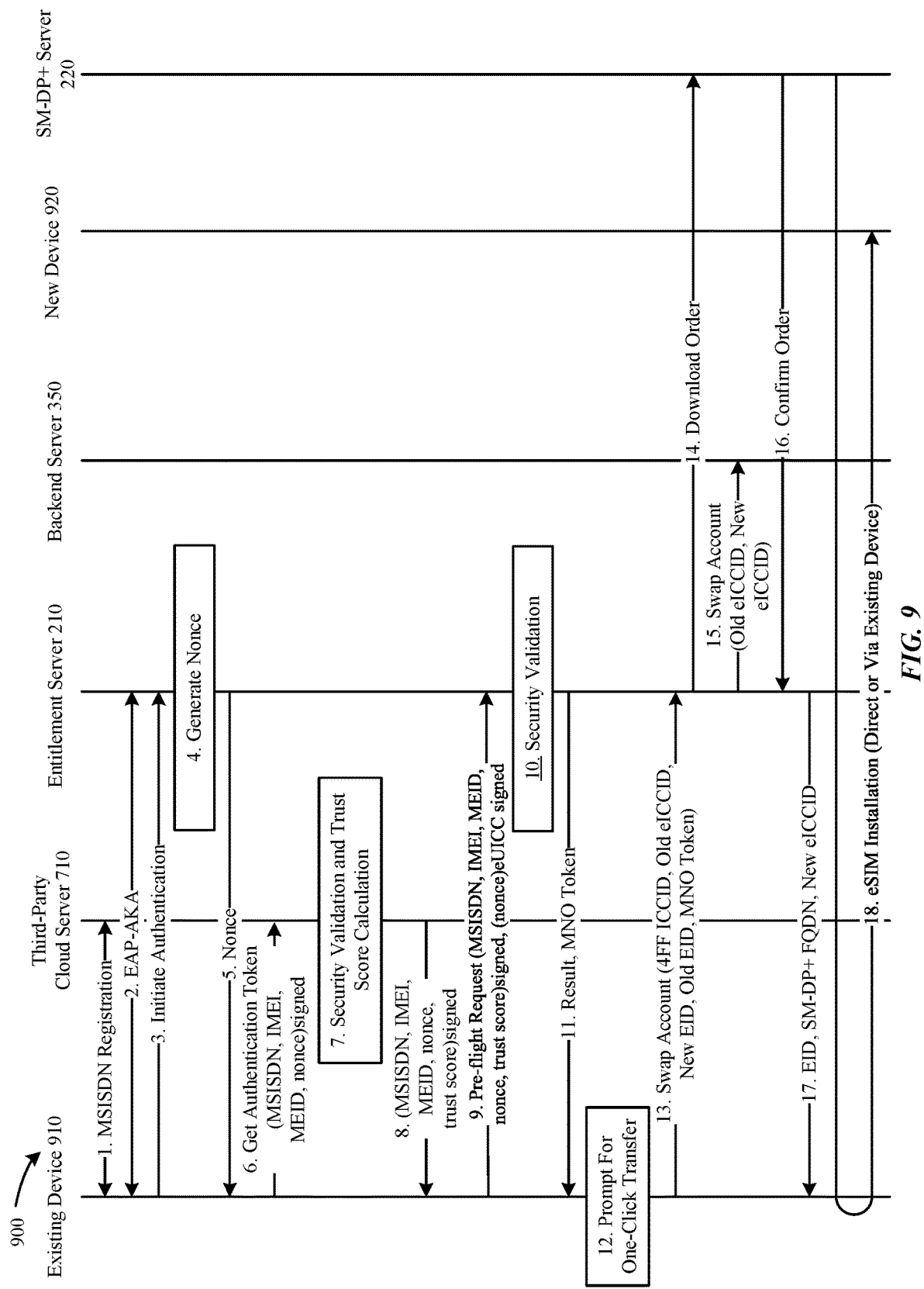
FIG. 9 illustrates an exemplary set of actions for transferring cellular service credentials for an eSIM from an existing wireless device to a new wireless device using an authentication token, according to some embodiments.

FIG. 9 illustrates a diagram 900 of an exemplary detailed message flow for secure authentication and transfer of cellular service credentials for an eSIM from an existing device 910 to a new device 920. At action 1, the existing device 910 registers an MSISDN associated with cellular wireless service for the existing device 910 with a third-party network-based cloud server 710. In some embodiments, the third-party cloud server 710 is an identity services (IDS) server maintained by a third-party other than a mobile network operator (MNO) that can communicate with network-based servers of the MNO with which cellular wireless service is to be established for a new device 920. The third-party cloud server 710 can provide information that assists with authentication by MNO network-based servers to validate providing cellular wireless service to the new device 920. At action 2, the existing device 910 performs an EAP-AKA procedure with an entitlement server 210 of an MNO to establish a secure communication link between the existing device 910 and the entitlement server 210. At action 3, the existing device 910 initiates authentication with the entitlement server 210, which responds to the existing device 910, at action 5, with a nonce generated by the entitlement server 210 at action 4. At action 6, the existing device 910 sends an authentication request (Get Authentication Token) to the third-part cloud server 710 to obtain a trust score from the third-part cloud server 710. The authentication request can be signed by the existing device 910 and can include one or more unique credentials associated with the existing device 910, such as an IMSI, an MSISDN, an IMEI, and/or an MEID, and the nonce previously received from the entitlement server 210. At action 7, the third-part cloud server 710 performs a security validation and calculates a trust score based at least in part on information provided by the existing device 910. In some embodiments, the existing device 910 provides an identity for an account maintained by the third-part cloud server 710 for a user of the existing device 910. The third-part cloud server 710 can use additional information maintained by the third-part cloud server 710 and/or accessible to the third-part cloud server 710 to generate the trust score. Examples of additional information include a history of associations of the MSISDN (of the existing device) or other credentials with the user and/or with the existing device 910. In some embodiments, the third-part cloud server 710 can query further servers (not shown) in order to obtain further information to generate the trust score. Based on the information, the third-part cloud server 710 generates the trust score. At action 8, the third-party cloud server 710 can reply to the existing device 910 with a signed message that includes the generated trust score. The signed message from the third-party cloud server 710 can also include the previously supplied credentials, e.g., the IMSI, the MSISDN, the IMEI, and/or the MEID, and the previously received nonce. The signed message from the third-party cloud server 710 can be signed by the entitlement server 210. At action 9, the existing device 910 can send a pre-flight request for security validation to the entitlement server 210. The pre-flight request can include the information provided by the third-part cloud server 710 including the trust score, credentials, and nonce as signed by the entitlement server 210. The pre-flight request can also include the nonce signed by the eUICC of the existing device 910. In response to the pre-flight request, the entitlement server 210 can perform a security validation procedure, at action 10, and, at action 11, return a result based on the security validation procedure together with a carrier token, when the entitlement server 210 authenticates the user for establishing cellular wireless service for the new device 920. In some embodiments, the entitlement server 210 can use the trust score supplied by the third-part cloud server 710 as part of the security validation procedure to determine whether to allow the new device 920 to access cellular wireless services. In some embodiments, the new device 920 can be added to an existing wireless service account with which the existing device 910 is associated. In some embodiments, the new device 920 replaces another device (not shown) that is associated with the existing device 910. After receiving the carrier token and result of the security validation, the existing device 910, at action 12, prompts the user to initiate an account transfer, e.g., a one-click transfer of a previously established user account from a previous device (not shown) to the new device 920. Responsive to an indication from the user to perform the account transfer, the existing device 110, at 212, sends a swap account request to the entitlement server 130. The swap account request can include the carrier token obtained from the entitlement server as well as a set of unique identifiers for the previous device (not shown) and/or for the new device 920, e.g., one or more of: an old eICCID, a SIM (4FF) integrated circuit card identifier (ICCID), an old EID, and/or a new EID. The entitlement server 210, at action 14, can provide a download order message to the SM-DP+ server 220, and receive a confirmation of the requested order at action 16. At action 15, the entitlement server 210 can also provide a swap account instruction to a backend server 350 to move a previously established user account from the previous (old) device to the new device 920. The swap account instruction can include unique identifiers, including an old eICCID, associated with an eSIM of the previous (old) device, and a new eICCID, associated with an eSIM for the new device 920. The entitlement server 210 can verify the carrier token obtained from the existing device 910 and can respond, at action 17, with additional credentials and/or information, e.g., an EID, an FQDN, and the new eICCID. After receiving the response from the entitlement server 210, the existing device 910, at action 18 can provide a communication conduit for installation and/or activation of an eSIM from a network-based subscription management server, e.g., the SM-DP+ server 220, to the new device 920.

Figure 10:
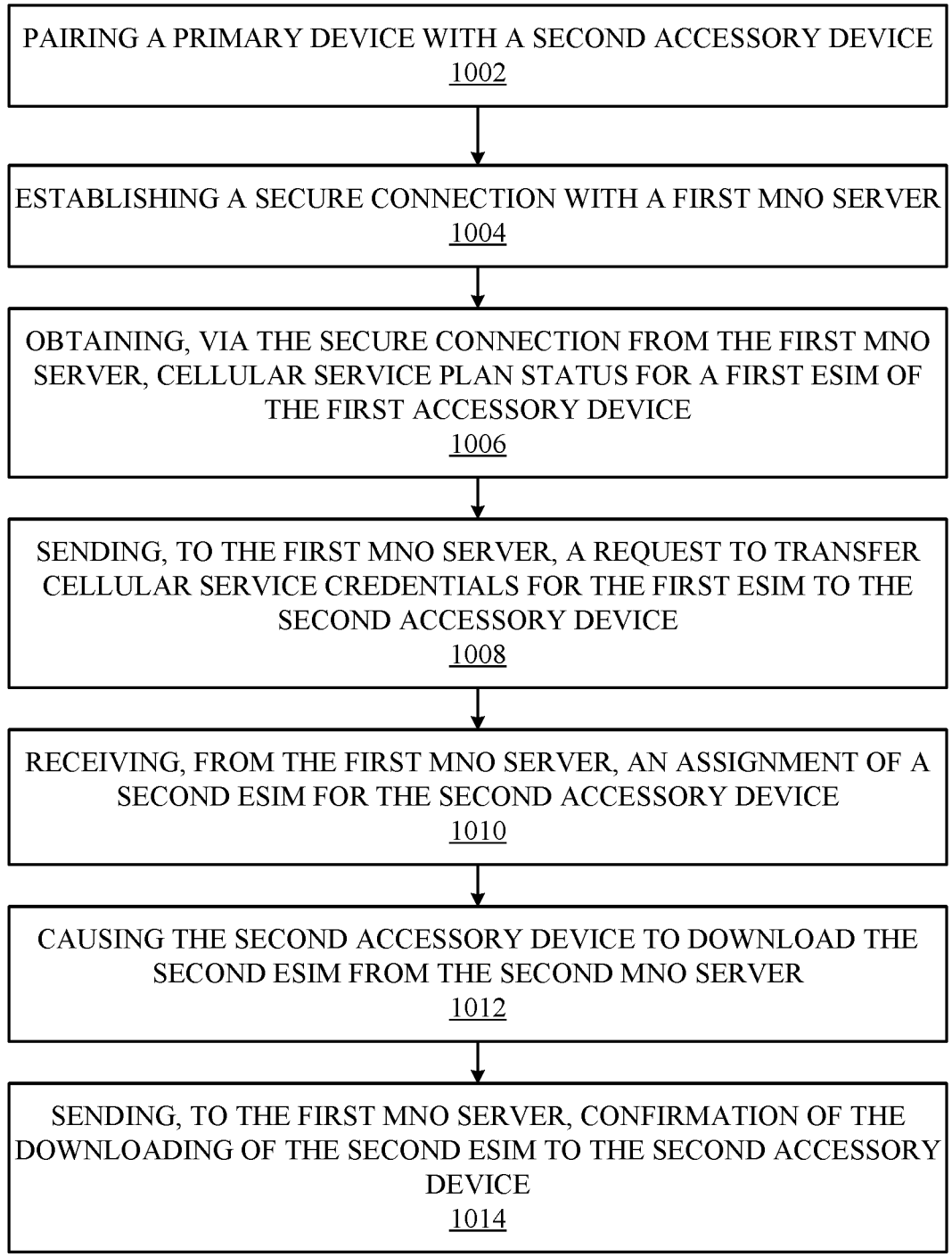
FIG. 10 illustrates an exemplary method performed by a primary device to transfer cellular service credentials for an eSIM from a first accessory device to a second accessory device, according to some embodiments.

FIG. 10 illustrates a flowchart 1000 of an exemplary method performed by a primary device 120 to transfer cellular service credentials for an eSIM from a first accessory device 110 to a second accessory device 150. At 1002, the primary device 120 pairs with the second accessory device 150. At 1004, the primary device 120 establishes a secure connection with a first MNO server, e.g., entitlement server 210. At 1006, the primary device 120 obtains, via the secure connection from the first MNO server, cellular service plan status for a first eSIM of the first accessory device 110. At 1008, the primary device 120 sends to the first MNO server a request to transfer cellular service credentials for the first eSIM to the second accessory device 150. At 1010, the primary device 120 receives from the first MNO server an assignment of a second eSIM for the second accessory device 150. At 1012, the primary device 120 causes the second accessory device 150 to download the second eSIM from a second MNO server, e.g., SM-DP+ server 220. At 1014, the primary device 120 sends to the first MNO server confirmation of the downloading of the second eSIM to the second accessory device 150. In some embodiments, the second accessory device 150 downloads the second eSIM directly from the second MNO server via a non-cellular access connection. In some embodiments, the second accessory device 150 downloads the second eSIM via a cellular (or non-cellular) access connection established the primary device 120. In some embodiments, the primary device 120 provides a data conduit by which the second accessory device 150 can download the second eSIM from the second MNO server.

In some embodiments, the first MNO server, after receipt of the confirmation, enables cellular service associated with the second eSIM for the second accessory device 150 and disables cellular service associated with the first eSIM for the first accessory device 110. In some embodiments, the method further includes the primary device 120 (*i*) presenting an option to transfer cellular service credentials from the first accessory device 110 to the second accessory device 150, and (ii) obtaining an indication to transfer the cellular service credentials to the second accessory device 150, where the primary device 120 sends the request to the first MNO server to transfer the cellular service credentials responsive to receipt of the indication. In some embodiments, the first MNO server is an entitlement server, and the primary device 120 authenticates with the first MNO server to establish the secure connection based on a SIM or eSIM installed in the primary device 120. In some embodiments, the SIM or eSIM of the primary device 120 and the first eSIM of the first accessory device 110 share a common MSISDN. In some embodiments, the SIM or eSIM of the primary device 120 and the first eSIM of the first accessory device 110 have distinct MSISDNs. In some embodiments the request to transfer the cellular service credentials for the first eSIM includes (i) a first eSIM identifier and a first hardware identifier of the first accessory device 110, and (ii) at least one hardware identifier of the second accessory device 150. In some embodiments, the at least one hardware identifier of the second accessory device includes an eUICC identifier (EID) and an IMEI of the second accessory device 150. In some embodiments, the primary device provides to the first MNO server user authentication for a registered user of the first accessory device 110. In some embodiments, the user authentication is provided based on a trust score managed by a third-party server, e.g., third-party cloud server 710. In some embodiments, the user authentication is provided based on interaction with a web-sheet server managed by an MNO associated with the first MNO server. In some embodiments, the assignment of the second eSIM for the second accessory device 150 includes a second SIM identifier and a network address for the second MNO server, e.g., for the SM-DP+ server 220. In some embodiments, the network address is a URL or a FQDN for the second MNO server. In some embodiments, the method further includes the primary device 120: (i) obtaining, from one or more MNO servers including the first MNO server, cellular service plan statuses for multiple eSIMs of the first accessory device 110, where the multiple eSIMs includes the first eSIM, (ii) presenting a list of transferable cellular service plans, and (iii) obtaining, responsive to presentation of the list, an indication to transfer cellular service credentials for the first eSIM to the second accessory device 150. In some embodiments, the method further includes the primary device 120: (iv) obtaining, responsive to presentation of the list, an indication to transfer cellular service credentials for at least one other eSIM of the multiple eSIMs to the second accessory device 150, and (v) downloading, from an MNO server associated with the one other eSIM, a third eSIM to the second accessory device 150. In some embodiments, the second eSIM and the third eSIM are associated with different MNOs.

Representative Embodiments

A method for transferring cellular service credentials from a first accessory device associated with a primary device to a second accessory device can include a primary device: i) pairing the primary device with the second accessory device; ii) establishing a secure connection with a first mobile network operator (MNO) server; iii) obtaining, via the secure connection from the first MNO server, cellular service plan status for a first electronic subscriber identity module (eSIM) of the first accessory device; iv) sending, to the first MNO server, a request to transfer cellular service credentials for the first eSIM to the second accessory device; v) receiving, from the first MNO server, an assignment of a second eSIM for the second accessory device; vi) causing the second accessory device to download the second eSIM from a second MNO server; and vii) sending, to the first MNO server, confirmation of the downloading of the second eSIM to the second accessory device, where the first MNO server, after receipt of the confirmation, enables cellular service associated with the second eSIM for the second accessory device and disables cellular service associated with the first eSIM for the first accessory device.

In some embodiments, the method for transferring cellular service credentials from the first accessory device associated with the primary device to the second accessory device can further include the primary device: i) presenting an option to transfer cellular service credentials from the first accessory device to the second accessory device, and ii) obtaining an indication to transfer the cellular service credentials to the second accessory device, where the primary device sends the request to the first MNO server to transfer the cellular service credentials responsive to receipt of the indication. In some embodiments, the first MNO server is an entitlement server, and the primary device authenticates with the first MNO server to establish the secure connection based on a SIM or eSIM installed in the primary device. In some embodiments, the SIM or eSIM of the primary device and the first eSIM of the first accessory device share a common mobile station international subscriber directory number (MSISDN). In some embodiments, the SIM or eSIM of the primary device and the first eSIM of the first accessory device have distinct mobile station international subscriber directory numbers (MSISDNs). In some embodiments, the request to transfer the cellular service credentials for the first eSIM includes: i) a first eSIM identifier and a first hardware identifier of the first accessory device, and ii) at least one hardware identifier of the second accessory device. In some embodiments, the at least one hardware identifier of the second accessory device includes an embedded universal integrated service circuit card (eUICC) identifier and an international mobile equipment identifier (IMEI) of the second accessory device. In some embodiments, the method further includes the primary device providing, to the first MNO server, user authentication for a registered user of the first accessory device. In some embodiments, the user authentication is provided based on a trust score managed by a third-party server. In some embodiments, the user authentication is provided based on interaction with a web-sheet server managed by an MNO associated with the first MNO server. In some embodiments, the assignment of the second eSIM for the second accessory device includes a second SIM identifier and a network address for the second MNO server. In some embodiments, the network address includes a universal resource locator (URL) or a fully quality domain name (FQDN) for the second MNO server.

In some embodiments, the method for transferring cellular service credentials from the first accessory device associated with the primary device to the second accessory device can further include the primary device: i) obtaining, from one or more MNO servers including the first MNO server, cellular service plan statuses for multiple eSIMs of the first accessory device, where the multiple eSIMs includes the first eSIM, ii) presenting a list of transferable cellular service plans; and iii) obtaining, responsive to presentation of the list, an indication to transfer cellular service credentials for the first eSIM to the second accessory device. In some embodiments, the method further includes the primary device i) obtaining, responsive to presentation of the list, an indication to transfer cellular service credentials for at least one other eSIM of the multiple eSIMs to the second accessory device, and ii) downloading, from an MNO server associated with the one other eSIM, a third eSIM to the second accessory device. In some embodiments, the second eSIM and the third eSIM are associated with different MNOs. In some embodiments, the primary device provides, to the second accessory device, the network address for the second MNO server. In some embodiments, the second accessory device connects to the second MNO server directly via a non-cellular access connection to download the second eSIM. In some embodiments, the second accessory device connects to the second MNO server via a cellular access connection established by the primary device.

In some embodiments, an apparatus is configured for operation in a primary device and includes one or more processors communicatively coupled to a memory storing instructions that, when executed by the one or processors, cause the primary device to perform a method to transfer cellular service credentials from a first accessory device associated with the primary device to a second accessory device by performing a set of actions as described herein.

In some embodiments, a primary device includes wireless circuitry, including one or more antennas, the wireless circuitry coupled to one or processors communicatively coupled to a memory storing instructions that, when executed by the one or processors, cause the primary device to perform a method to transfer cellular service credentials from a first accessory device associated with the primary device to a second accessory device by performing a set of actions as described herein.

Representative Exemplary Apparatus

Figure 11:
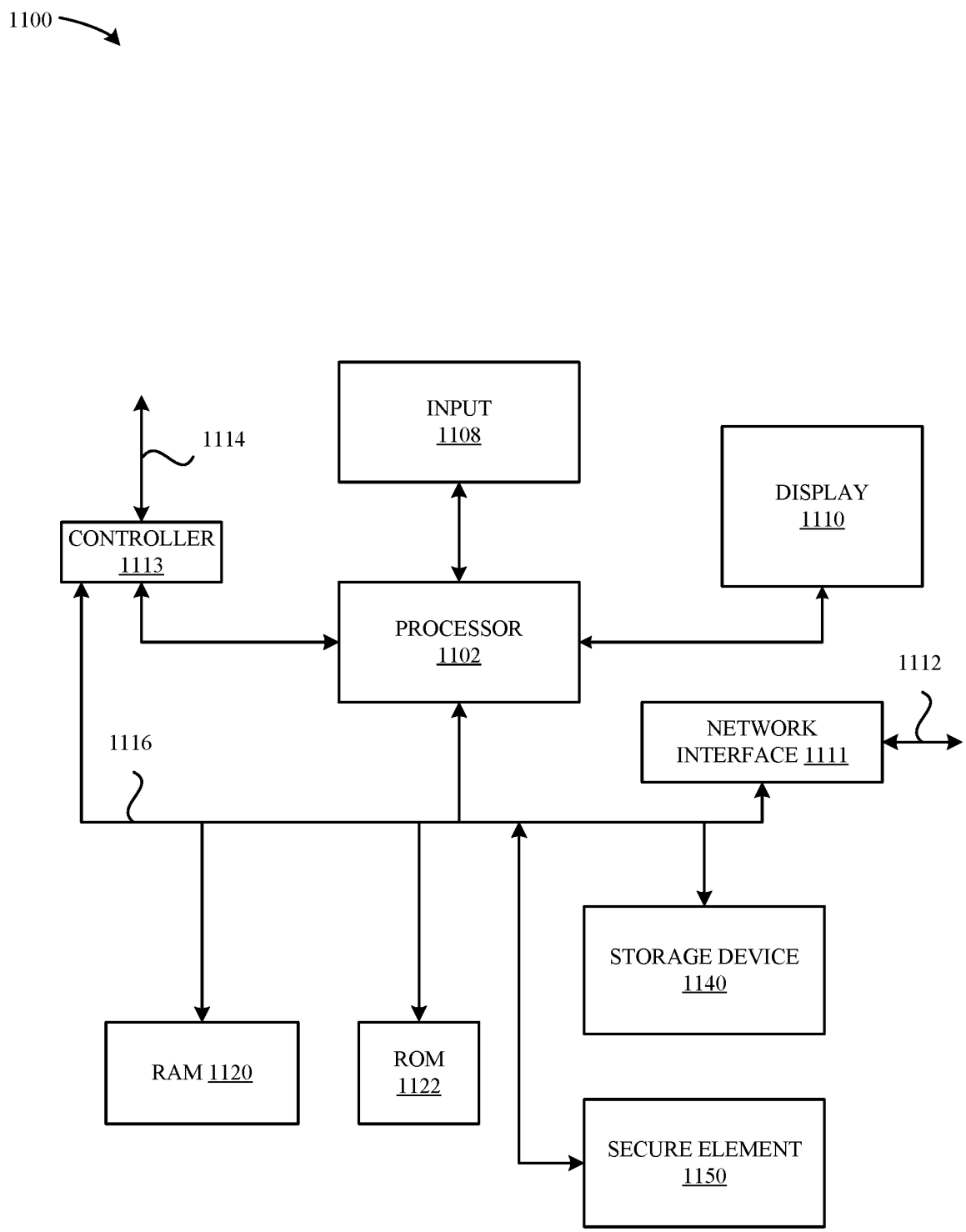
FIG. 11 illustrates a block diagram of exemplary elements of a mobile wireless device, according to some embodiments.

FIG. 11 illustrates in block diagram format an exemplary computing device 1100 that can be used to implement the various components and techniques described herein, according to some embodiments. In particular, the detailed view of the exemplary computing device 1100 illustrates various components that can be included in the first accessory device 110, the second accessory device 150, and/or the primary device 120. As shown in FIG. 11, the computing device 1100 can include a processor 1102 that represents a microprocessor or controller for controlling the overall operation of computing device 1100. In some embodiments, the computing device 1100 can also include a user input device 1108 that allows a user of the computing device 1100 to interact with the computing device 1100. For example, in some embodiments, the user input device 1108 can take a variety of forms, such as a button, keypad, dial, touch screen, audio input interface, visual/image capture input interface, input in the form of sensor data, etc. In some embodiments, the computing device 1100 can include a display 1110 (screen display) that can be controlled by the processor 1102 to display information to the user. A data bus 1116 can facilitate data transfer between at least a storage device 1140, the processor 1102, and a controller 1113. The controller 1113 can be used to interface with and control different equipment through an equipment control bus 1114. The computing device 1100 can also include a network/bus interface 1111 that couples to a data link 1112. In the case of a wireless connection, the network/bus interface 1111 can include wireless circuitry, such as a wireless transceiver and/or baseband processor. The computing device 1100 can also include a secure element 1150. The secure element 1150 can include an eUICC for the first and second accessory devices 110, 150 (and/or a UICC for the primary device 120).

The computing device 1100 also includes a storage device 1140, which can include a single storage or a plurality of storage devices and a storage management module that manages one or more partitions within the storage device 1140. In some embodiments, storage device 1140 can include flash memory, semiconductor (solid state) memory or the like. The computing device 1100 can also include a Random-Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for transferring cellular service credentials from a first accessory device associated with a primary device to a second accessory device, the method comprising:
   by the primary device:
      pairing the primary device with the second accessory device;
      establishing a secure connection with a first mobile network operator (MNO) server;
      obtaining, via the secure connection from the first MNO server, cellular service plan status for a first electronic subscriber identity module (eSIM) of the first accessory device;
      sending, to the first MNO server, a request to transfer cellular service credentials for the first eSIM to the second accessory device;
      receiving, from the first MNO server, an assignment of a second eSIM for the second accessory device;
      causing the second accessory device to download the second eSIM from a second MNO server; and
      sending, to the first MNO server, confirmation of the downloading of the second eSIM to the second accessory device,
   wherein the first MNO server, after receipt of the confirmation, enables cellular service associated with the second eSIM for the second accessory device and disables cellular service associated with the first eSIM for the first accessory device.

2. The method of claim 1, further comprising:
   at the primary device:
      presenting an option to transfer cellular service credentials from the first accessory device to the second accessory device; and
      obtaining an indication to transfer the cellular service credentials to the second accessory device,
      wherein the primary device sends the request to the first MNO server to transfer the cellular service credentials responsive to receipt of the indication.

3. The method of claim 1, wherein:
   the first MNO server comprises an entitlement server; and
   the primary device authenticates with the first MNO server to establish the secure connection based on a SIM or eSIM installed in the primary device.

4. The method of claim 3, wherein the SIM or eSIM of the primary device and the first eSIM of the first accessory device share a common mobile station international subscriber directory number (MSISDN).

5. The method of claim 3, wherein the SIM or eSIM of the primary device and the first eSIM of the first accessory device have distinct mobile station international subscriber directory numbers (MSISDNs).

6. The method of claim 1, wherein, the request to transfer the cellular service credentials for the first eSIM comprises:
   a first eSIM identifier and a first hardware identifier of the first accessory device; and
   at least one hardware identifier of the second accessory device.

7. The method of claim 6, wherein the at least one hardware identifier of the second accessory device comprises an embedded universal integrated service circuit card (eUICC) identifier and an international mobile equipment identifier (IMEI) of the second accessory device.

8. The method of claim 1, further comprising:
   providing, by the primary device to the first MNO server, user authentication for a registered user of the first accessory device.

9. The method of claim 8, wherein the user authentication is provided based on a trust score managed by a third-party server.

10. The method of claim 8, wherein the user authentication is provided based on interaction with a web-sheet server managed by an MNO associated with the first MNO server.

11. The method of claim 1, wherein the assignment of the second eSIM for the second accessory device includes a second SIM identifier and a network address for the second MNO server.

12. The method of claim 11, wherein the network address comprises a universal resource locator (URL) or a fully quality domain name (FQDN) for the second MNO server.

13. The method of claim 1, further comprising:
   by the primary device:
      obtaining, from one or more MNO servers including the first MNO server, cellular service plan statuses for multiple eSIMs of the first accessory device, wherein the multiple eSIMs includes the first eSIM;
      presenting a list of transferable cellular service plans; and
      obtaining, responsive to presentation of the list, an indication to transfer cellular service credentials for the first eSIM to the second accessory device.

14. The method of claim 13, further comprising:
by the primary device:
obtaining, responsive to presentation of the list, an indication to transfer cellular service credentials for at least one other eSIM of the multiple eSIMs to the second accessory device; and
downloading, from an MNO server associated with the one other eSIM, a third eSIM to the second accessory device.

15. The method of claim 14, wherein the second eSIM and the third eSIM are associated with different MNOs.

16. The method of claim 1, further comprising:
by the primary device:
providing, to the second accessory device, a network address for the second MNO server.

17. The method of claim 1, wherein the second accessory device connects to the second MNO server directly via a non-cellular access connection to download the second eSIM.

18. The method of claim 1, wherein the second accessory device connects to the second MNO server via a cellular access connection established by the primary device.

19. An apparatus configured for operation in a primary device, the apparatus comprising:
one or more processors; and
a memory communicatively coupled to the one or more processors and storing instructions that, when executed by the one or more processors, cause the primary device to transfer cellular service credentials from a first accessory device associated with the primary device to a second accessory device by performing a set of actions including:
pairing the primary device with the second accessory device;
establishing a secure connection with a first mobile network operator (MNO) server;
obtaining, via the secure connection from the first MNO server, cellular service plan status for a first electronic subscriber identity module (eSIM) of the first accessory device;
sending, to the first MNO server, a request to transfer cellular service credentials for the first eSIM to the second accessory device;
receiving, from the first MNO server, an assignment of a second eSIM for the second accessory device;
causing the second accessory device to download the second eSIM from a second MNO server; and
sending, to the first MNO server, confirmation of the downloading of the second eSIM to the second accessory device,
wherein the first MNO server, after receipt of the confirmation, enables cellular service associated with the second eSIM for the second accessory device and disables cellular service associated with the first eSIM for the first accessory device.

20. A primary device comprising:
wireless circuitry comprising one or more antennas;
one or more processors communicatively coupled to the wireless circuitry; and
a memory communicatively coupled to the one or more processors and storing instructions that, when executed by the one or more processors, cause the primary device to transfer cellular service credentials from a first accessory device associated with the primary device to a second accessory device by performing a set of actions including:
pairing the primary device with the second accessory device;
establishing a secure connection with a first mobile network operator (MNO) server;
obtaining, via the secure connection from the first MNO server, cellular service plan status for a first electronic subscriber identity module (eSIM) of the first accessory device;
sending, to the first MNO server, a request to transfer cellular service credentials for the first eSIM to the second accessory device;
receiving, from the first MNO server, an assignment of a second eSIM for the second accessory device;
causing the second accessory device to download the second eSIM from a second MNO server; and
sending, to the first MNO server, confirmation of the downloading of the second eSIM to the second accessory device,
wherein the first MNO server, after receipt of the confirmation, enables cellular service associated with the second eSIM for the second accessory device and disables cellular service associated with the first eSIM for the first accessory device.

* * * * *

UNITED STATES PATENT AND TRADEMARK OFFICE
CERTIFICATE OF CORRECTION

PATENT NO. : 11,463,883 B2  
APPLICATION NO. : 17/001575  
DATED : October 4, 2022  
INVENTOR(S) : Anish Kumar Goyal et al.

Page 1 of 1

It is certified that error appears in the above-identified patent and that said Letters Patent is hereby corrected as shown below:

In the Specification

At Column 16, Line 37: "a third-part cloud network based serer 710 for secure storage" should read -- a third-party cloud network based server 710 for secure storage --.

Signed and Sealed this  
Tenth Day of October, 2023

Katherine Kelly Vidal  
*Director of the United States Patent and Trademark Office*